United States Patent
Könitz

(10) Patent No.: US 11,215,168 B2
(45) Date of Patent: Jan. 4, 2022

(54) WIND TURBINE AND COOLING DEVICE FOR A WIND TURBINE

(71) Applicant: Wobben Properties GmbH, Aurich (DE)

(72) Inventor: Malte Könitz, Oldenburg (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/739,914

(22) PCT Filed: Jun. 27, 2016

(86) PCT No.: PCT/EP2016/064802
§ 371 (c)(1),
(2) Date: Dec. 26, 2017

(87) PCT Pub. No.: WO2017/001318
PCT Pub. Date: Jan. 5, 2017

(65) Prior Publication Data
US 2018/0187656 A1    Jul. 5, 2018

(30) Foreign Application Priority Data
Jul. 1, 2015  (DE) .................... 10 2015 212 321.9

(51) Int. Cl.
*F03D 80/60* (2016.01)
*F03D 13/20* (2016.01)
*F03D 80/00* (2016.01)

(52) U.S. Cl.
CPC ............. *F03D 80/60* (2016.05); *F03D 13/20* (2016.05); *F03D 80/00* (2016.05);
(Continued)

(58) Field of Classification Search
CPC .......... F03D 80/60; F03D 80/00; F03D 13/20; Y02E 10/728; F05B 2260/20;
(Continued)

(56) References Cited

U.S. PATENT DOCUMENTS 2,464,000 A * 3/1949 Schild .................... F24F 13/15
454/349
2,800,851 A * 7/1957 Kronrad ................. F24F 7/013
454/221
(Continued)

FOREIGN PATENT DOCUMENTS

AT          513671 B1     11/2014
CN       101970869 A      2/2011
(Continued)

OTHER PUBLICATIONS

U.S. Department of State Bureau of Diplomatic Security Office of Physical Security Programs Physical Security Division, "Certification Standard Forced Entry and Ballistic Resistance of Structural Systems", Apr. 30, 1993, US Department of State, Revision G (Year: 1993).*

*Primary Examiner* — Igor Kershteyn
*Assistant Examiner* — Joshua R Beebe
(74) *Attorney, Agent, or Firm* — Seed Intellectual Property Law Group LLP

(57) ABSTRACT

There is provided a wind turbine comprising a tower which has a wall, a cooling device having an air inlet unit and an air outlet unit which are provided in the lower region of the tower. The air inlet unit and the air outlet unit each have an outer portion, a central portion and a shutter unit. The outer portions are provided outside the wall of the tower, the central portions are provided in the region of the wall of the tower and the shutter units are provided within the tower. The air inlet unit and the air outlet unit have fixing units, by
(Continued)

means of which the central portions can be fixed to the wall of the tower from the interior of the tower.

6 Claims, 35 Drawing Sheets

(52) U.S. Cl.
CPC ....... *F05B 2260/20* (2013.01); *F05B 2260/64* (2013.01); *Y02E 10/728* (2013.01)

(58) Field of Classification Search
CPC . F05B 2260/64; F24F 1/52; F24F 1/06; F24F 1/46; F24F 1/54; F24F 1/02; F24F 1/03; F24F 1/48; F24F 1/56; F24F 1/58; F24F 1/62; F24F 2007/003; F24F 2221/17; F24F 2221/44; F24F 11/30
See application file for complete search history.

(56) References Cited

U.S. PATENT DOCUMENTS

| | | | | |
|---|---|---|---|---|
| 3,421,296 A * | 1/1969 | Beurer, Sr. | ............ | F02B 61/04 55/306 |
| 4,013,120 A * | 3/1977 | Rheinheimer | ............ | F24F 1/02 165/48.1 |
| 4,018,266 A * | 4/1977 | Kay | ............ | F24F 1/02 165/237 |
| 4,375,183 A * | 3/1983 | Lynch | ............ | F24F 13/15 137/601.09 |
| 4,709,659 A * | 12/1987 | Quante, III | ............ | E05G 7/002 109/10 |
| 4,817,708 A * | 4/1989 | Ono | ............ | F24F 7/013 165/166 |
| 5,567,200 A * | 10/1996 | Swartzendruber | ... | A01K 1/0052 454/257 |
| 5,672,101 A * | 9/1997 | Thomas | ............ | B60H 1/00428 454/136 |
| 6,149,698 A * | 11/2000 | Uehara | ............ | F24F 7/013 454/351 |
| 6,345,513 B1 * | 2/2002 | Kim | ............ | F24F 13/20 62/263 |
| 8,058,742 B2 | 11/2011 | Erdman et al. | | |
| 8,227,932 B2 * | 7/2012 | Murata | ............ | F03D 80/60 290/55 |
| 8,482,149 B2 | 7/2013 | Uphues et al. | | |
| 8,601,804 B2 * | 12/2013 | Akashi | ............ | F03D 9/28 60/398 |
| 8,857,500 B2 * | 10/2014 | Tsuji | ............ | F24F 12/006 165/53 |
| 9,175,491 B2 | 11/2015 | Gawrisch et al. | | |
| 10,077,760 B2 | 9/2018 | Tschirch | | |
| 2003/0072648 A1 * | 4/2003 | Han | ............ | F01D 25/30 415/119 |
| 2005/0003755 A1 * | 1/2005 | Koessler | ............ | F24F 13/08 454/359 |
| 2007/0006541 A1 * | 1/2007 | Seidel | ............ | E02D 27/42 52/292 |
| 2008/0182504 A1 * | 7/2008 | Dijk | ............ | F24F 13/082 454/276 |
| 2009/0163134 A1 * | 6/2009 | Peck | ............ | E04D 13/174 454/365 |
| 2010/0308596 A1 * | 12/2010 | Gawrisch | ............ | E04H 12/003 290/55 |
| 2013/0009405 A1 | 1/2013 | Sato et al. | | |
| 2014/0216680 A1 * | 8/2014 | Tschirch | ............ | F03D 9/00 165/4 |
| 2015/0204600 A1 * | 7/2015 | Fay | ............ | F25B 1/005 62/129 |
| 2016/0102493 A1 | 4/2016 | Pollmann et al. | | |

FOREIGN PATENT DOCUMENTS

| | | | | |
|---|---|---|---|---|
| CN | 102828921 A | 12/2012 | | |
| CN | 103498766 A | 1/2014 | | |
| CN | 204421262 U | 6/2015 | | |
| DE | 102008012664 A1 | 8/2009 | | |
| DE | 102008035350 A1 | 2/2010 | | |
| DE | 102013207908 A1 * | 10/2014 | ............ | E06B 5/113 |
| EP | 2535580 A1 | 12/2012 | | |
| FR | 2764550 A1 * | 12/1998 | ......... | B60H 1/00849 |
| JP | 2009-531579 A | 9/2009 | | |
| JP | 2011-163179 A | 8/2011 | | |
| JP | 2014-526634 A | 10/2014 | | |
| KR | 101291177 B1 | 7/2013 | | |
| WO | 2011/096080 A1 | 8/2011 | | |
| WO | 2013/021488 A1 | 2/2013 | | |
| WO | 2014/177357 A1 | 11/2014 | | |

* cited by examiner

WIND TURBINE AND COOLING DEVICE FOR A WIND TURBINE

BACKGROUND

Technical Field

The present invention concerns a wind turbine and a cooling device for a wind turbine.

Description of the Related Art

Any wind turbine has a large number of components which in operation generate heat. Under given conditions like for example a high outside temperature, a prolonged period of operation at nominal power output, etc., those components have to be cooled.

On the German patent application from which priority is claimed the German Patent and Trade Mark Office searched the following documents: DE 10 2008 035 350 A1, AT 513 671 B1, US 2010/0308596 A1 and US 2013/0009405 A1.

BRIEF SUMMARY

Provided is a wind turbine and a cooling device for a wind turbine, which permits effective cooling of the wind turbine.

Thus there is provided a wind turbine comprising a tower which has a wall, a cooling device having an air inlet unit and an air outlet unit which are provided in the lower region of the tower. The air inlet unit and the air outlet unit each have an outer portion, a central portion and a shutter unit. The outer portions are provided outside the wall of the tower, the central portions are provided in the region of the wall of the tower and the shutter units are provided within the tower. The air inlet unit and the air outlet unit have fixing units, by means of which the central portions can be fixed to the wall of the tower from the interior of the tower.

According to an aspect of the present invention the outer portions have at least one protective grid, wherein bars of the protective grid are fixedly welded together.

According to a further aspect of the present invention the shutter units each have a shutter frame, shutter flaps and an adjusting unit, wherein the shutter flaps are displaceable by means of the adjusting unit.

According to a further aspect of the present invention the air inlet unit and/or the air outlet unit has a second protective grid in the interior of the outer portion. Also provided is a cooling device for a wind turbine, having an air inlet unit and an air outlet unit. The air inlet unit and the air outlet unit each have an outer portion, a central portion and a shutter unit. The outer portions can be arranged outside a wall of a tower, the central portion can be arranged in the region of the wall of a tower and the shutter units can be arranged within the tower.

The air inlet unit and the air outlet unit each have fixing units, by means of which the central portions can be fixed to the wall of the tower from the interior of the tower.

The invention concerns the notion of providing an air inlet and an air outlet for a cooling device in the lower region of a tower of a wind turbine. In particular the air inlet and the air outlet are to be of such a configuration that they are intrusion-resistant. In particular the air inlet and the air outlet are to be of a resistance class of 4, that is to say an intruder should require longer than 10 minutes in order to be able to penetrate into the air inlet or the air outlet.

The air inlet can be in the form of an air feed cowl and the air outlet can be in the form of an air discharge cowl. The air inlet can have a drop separator and an air filter in a solid frame. Both the air inlet and the air outlet can have shutter flaps which are optionally controllable.

The cooling device can have heat exchangers, fans, passages for cooling fluid or ventilation passages.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
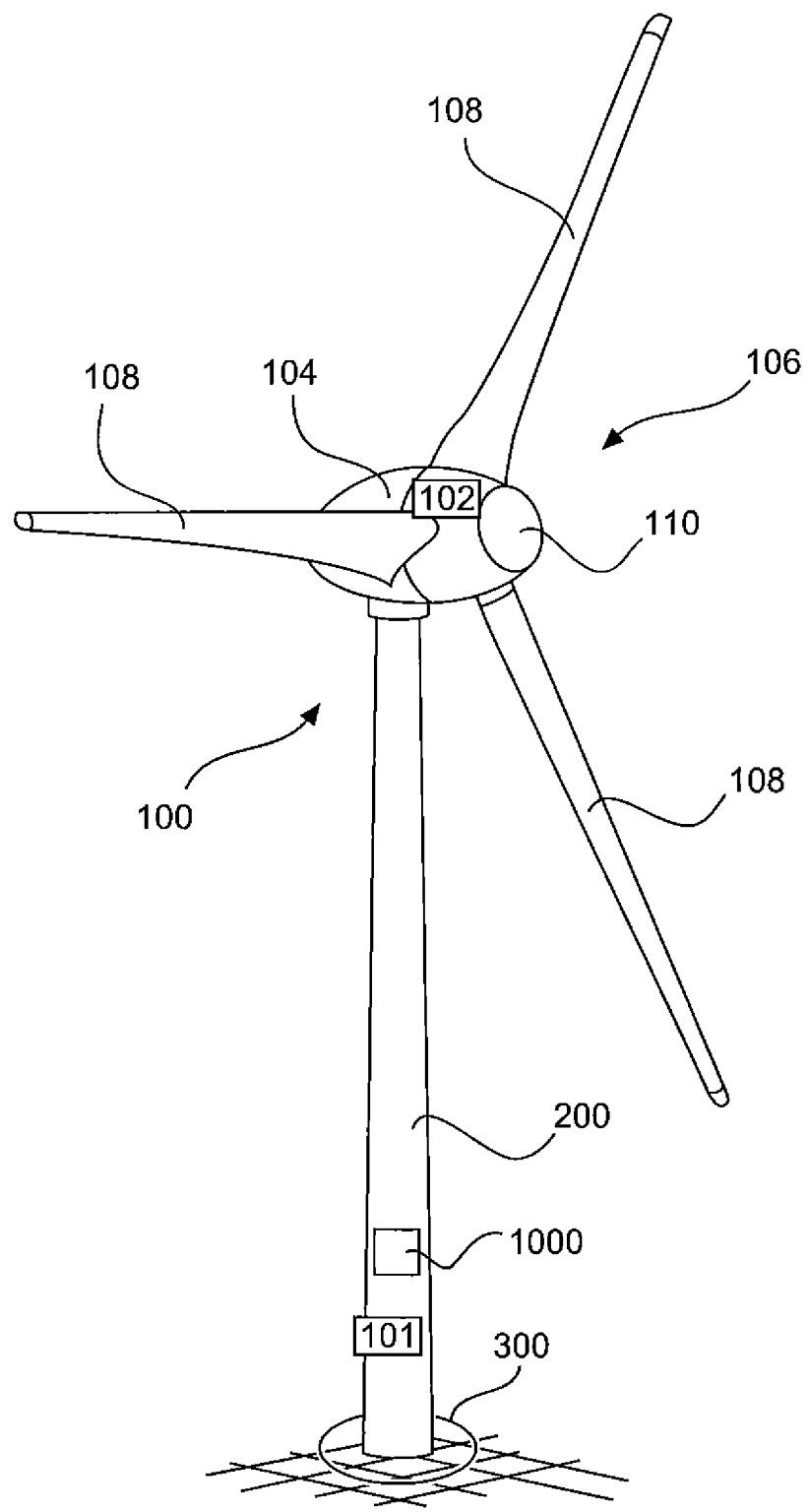
FIG. 1 shows a diagrammatic view of a wind turbine according to the invention.

FIG. 1 shows a diagrammatic view of a wind turbine according to the invention. The wind turbine 100 has a tower 200 and a pod 104 on the tower 200. Provided on the pod 104 is an aerodynamic rotor 106 having three rotor blades 108 and a spinner 110. In operation of the wind turbine the aerodynamic rotor 106 is caused to rotate by the wind and thus also rotates a rotor or rotor member of a generator 102 which is coupled directly or indirectly to the aerodynamic rotor 106. The electric generator 102 is arranged in the pod 104 and generates electrical energy. The pitch angle of the rotor blades 108 can be varied by pitch motors at the rotor blade roots of the respective rotor blades 108.

For example the generator 102 or a power cabinet 101 (which for example have inverters, transformers and the like) can generate considerable heat during operation of the wind turbine, and that heat is to be dissipated by a cooling device 1000. The cooling device 1000 can have heat exchangers, fans, passages for cooling fluid or ventilation passages.

Figure 2:
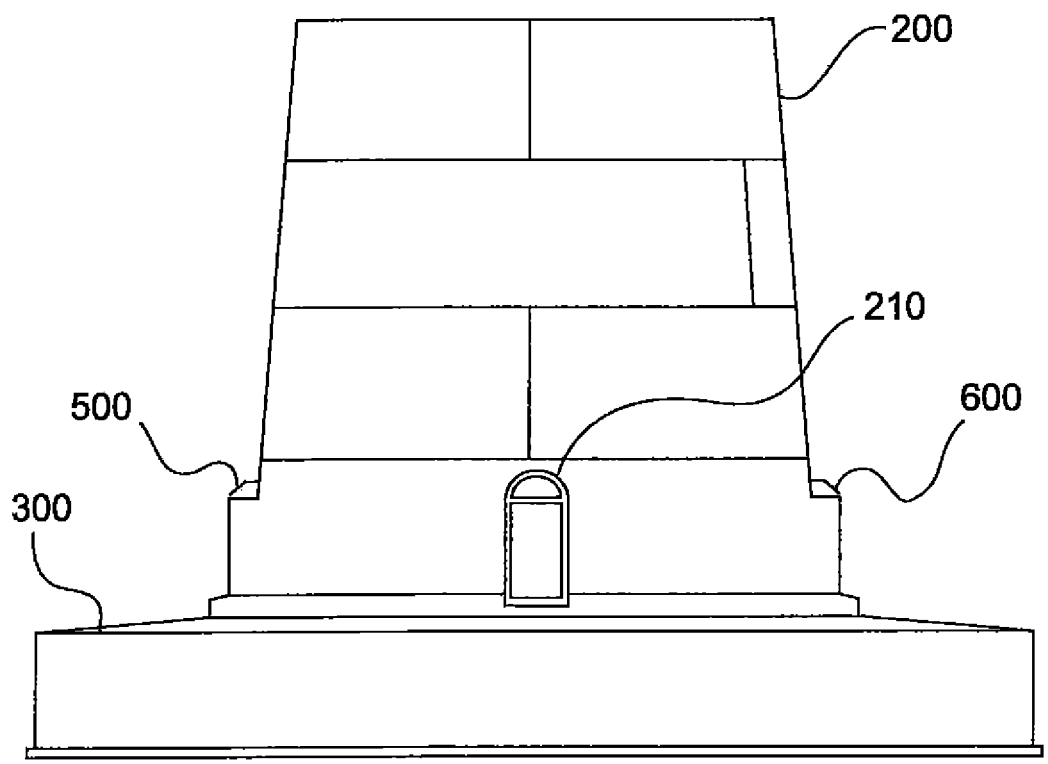
FIG. 2 shows a portion of a tower of a wind turbine.

FIG. 2 shows a portion of a tower of a wind turbine. The tower 200 has a wall 201. For example a door 210, an air inlet unit 500 and an air outlet unit 600 as part of a cooling device 1000 are shown in the lower region of the tower 200. The cooling device 1000 has at least one air inlet unit 500 as an air inlet and an air outlet unit 600 as an air outlet. The tower can be placed for example on a foundation 300. A portion of the air inlet or outlet unit is provided outside the tower, a portion is provided in the wall of the tower and a portion is provided within the tower.

The air inlet unit 500 and the air outlet unit 600 can optionally be of the same design structure.

FIGS. 3A to 3H respectively show an outside view of an air inlet unit according to a first embodiment. The air inlet unit can be in the form of an air feed cowl and the air inlet unit 500 has a shutter unit 530, a central portion 520 and an outer portion 510. The outer portion 510 is disposed in the installed condition outside the wall 201 of the tower 200 of the wind turbine. In the installed condition the central portion 520 is disposed within the wall 201 of the tower 200 of the wind turbine and the shutter unit 530 projects into the interior of the tower 200 of the wind turbine. The outer portion 510 has a bottom 510a and an upper portion 510b. Lifting eyes 511 for transport purposes can be provided in the upper portion 510b. Transport protection units 512 can be provided at the bottom 510a. The outer portion 510 has two side surfaces 513 and a front surface 514. The side surfaces 513 and the front surface 514 respectively have a completely welded protective grid 513a and 514a as intrusion and vandalism protection.

Adjusting feet with a transport protection 512 can be provided at the bottom 510a.

FIGS. 3I to 3M show various sectional views of the air inlet unit according to the second embodiment. A plurality of air filters 541, 542 is provided within the outer portion 510 and behind the protective grids 513a, 514a respectively. The air filters 541, 542 can be riveted both to each other and also to the outer portion 510.

Figure 3A:
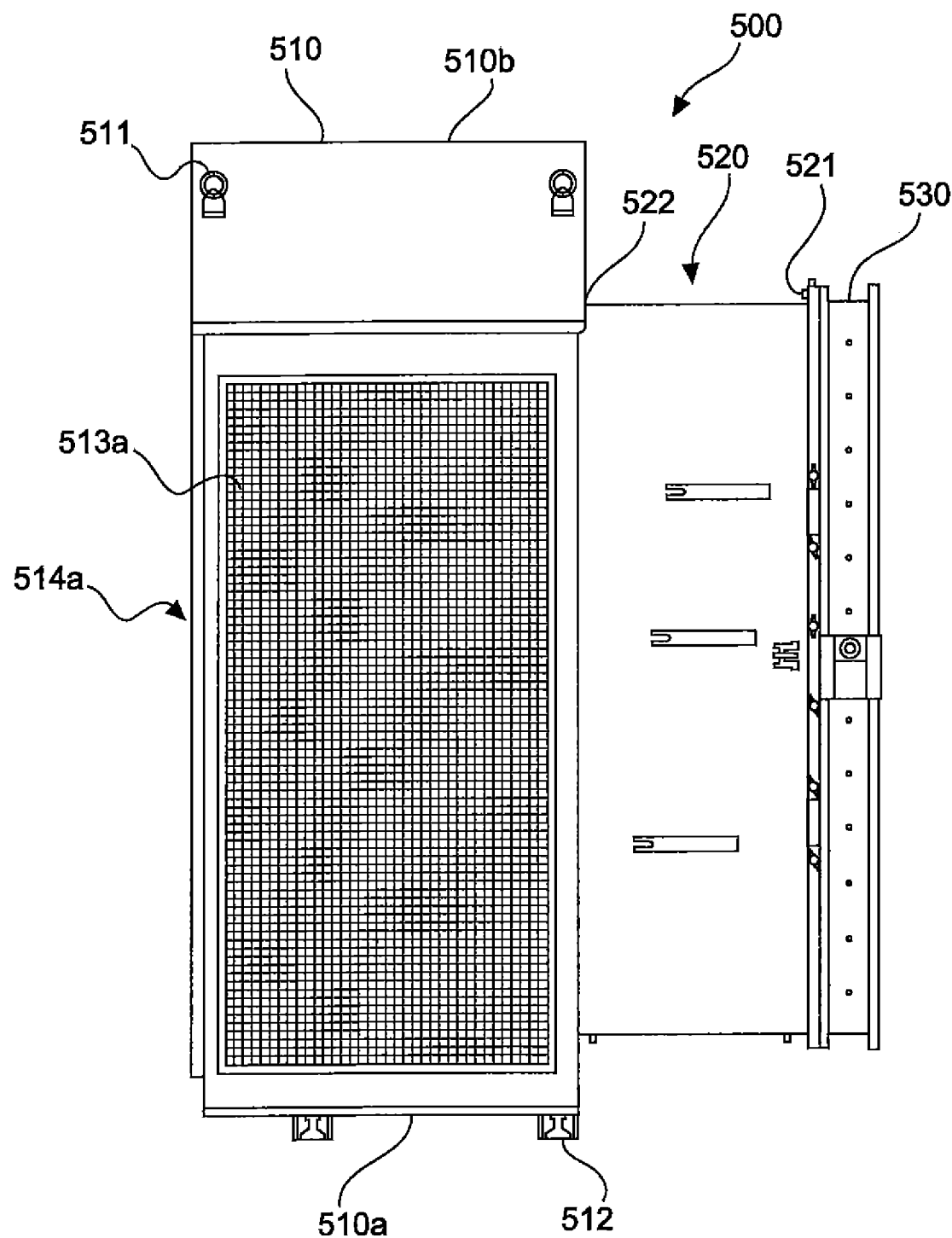
FIGS. 3A to 3P respectively show various views of an air inlet unit according to a first embodiment.
Figure 3B:
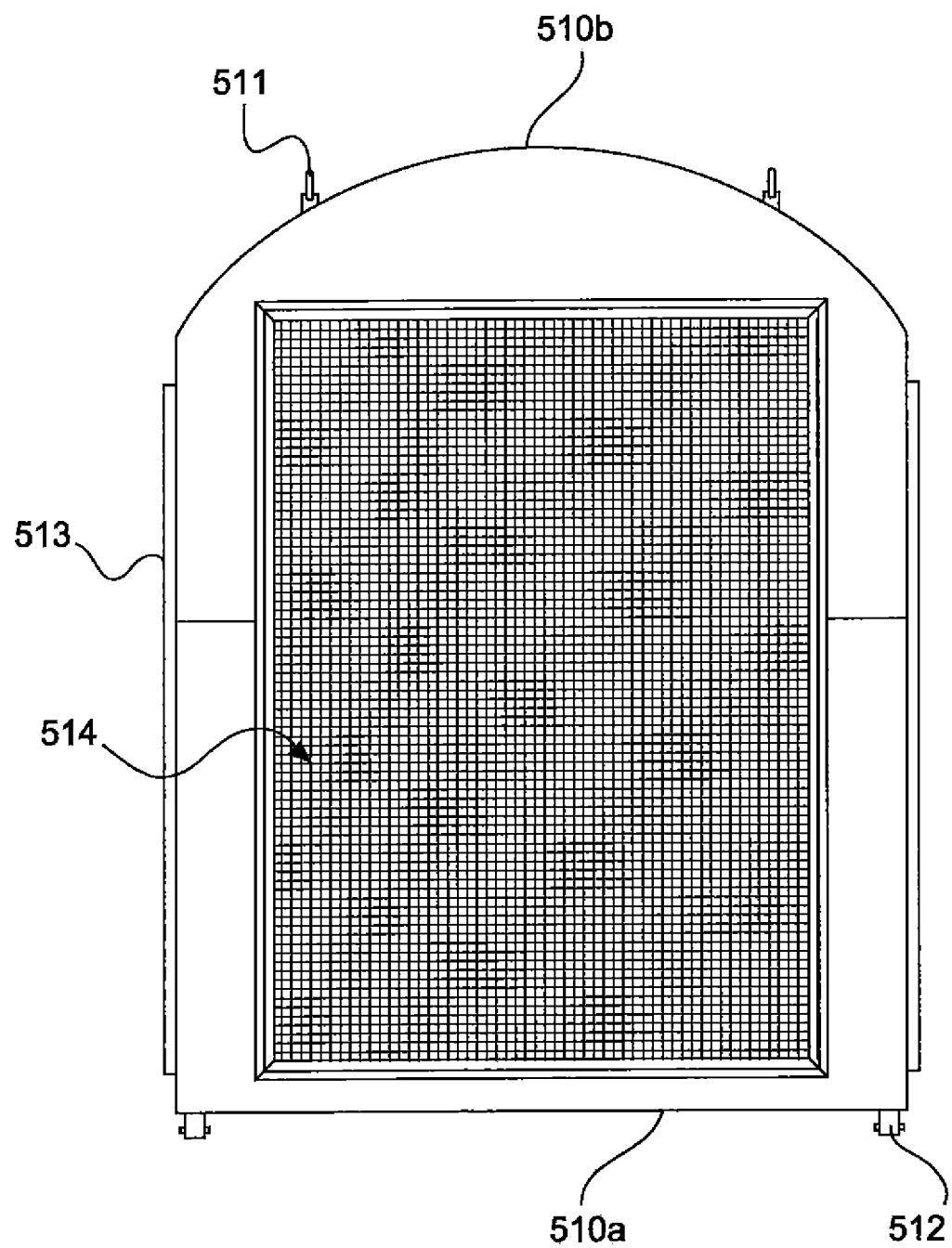
Figure 3C:
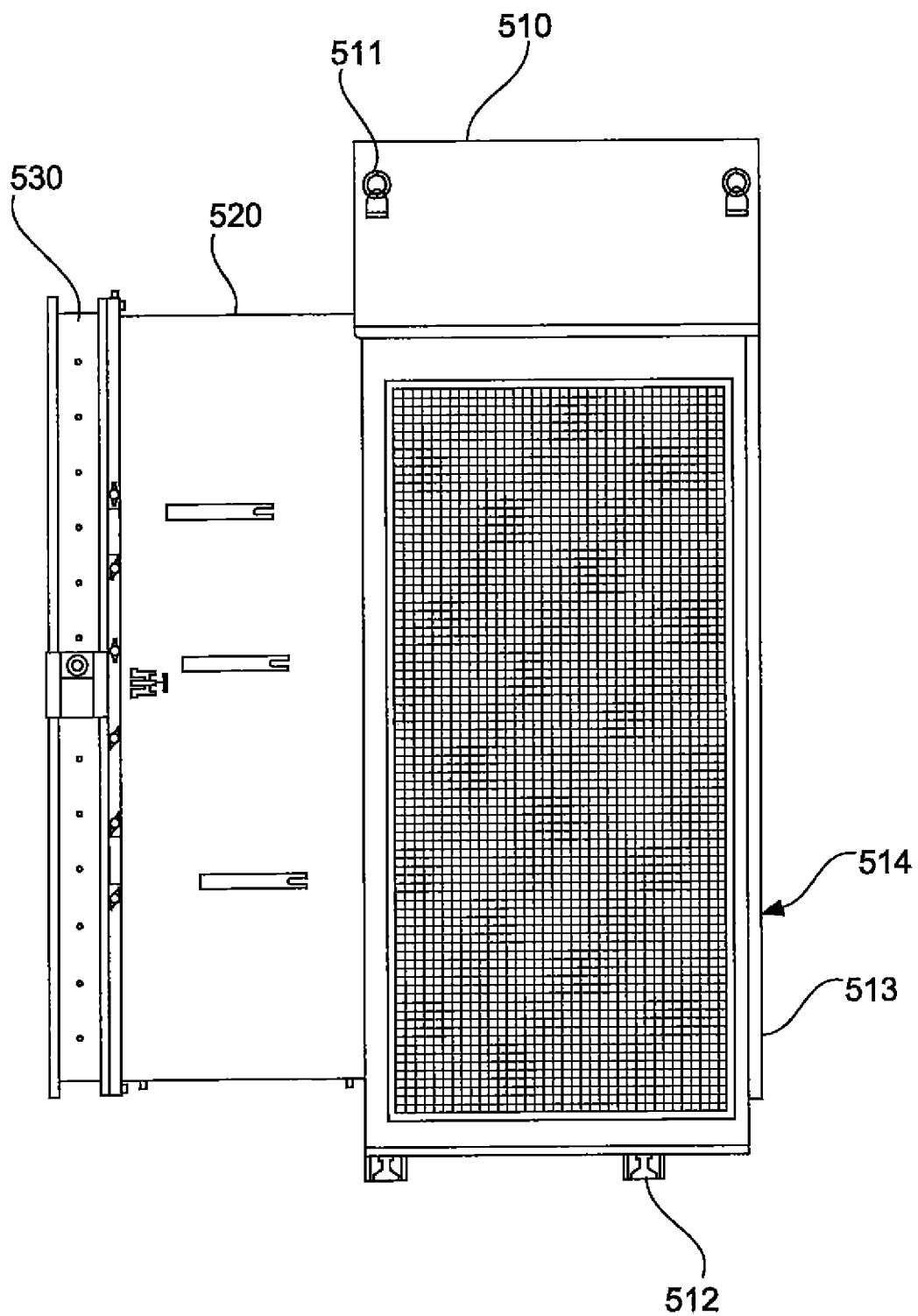
Figure 3D:
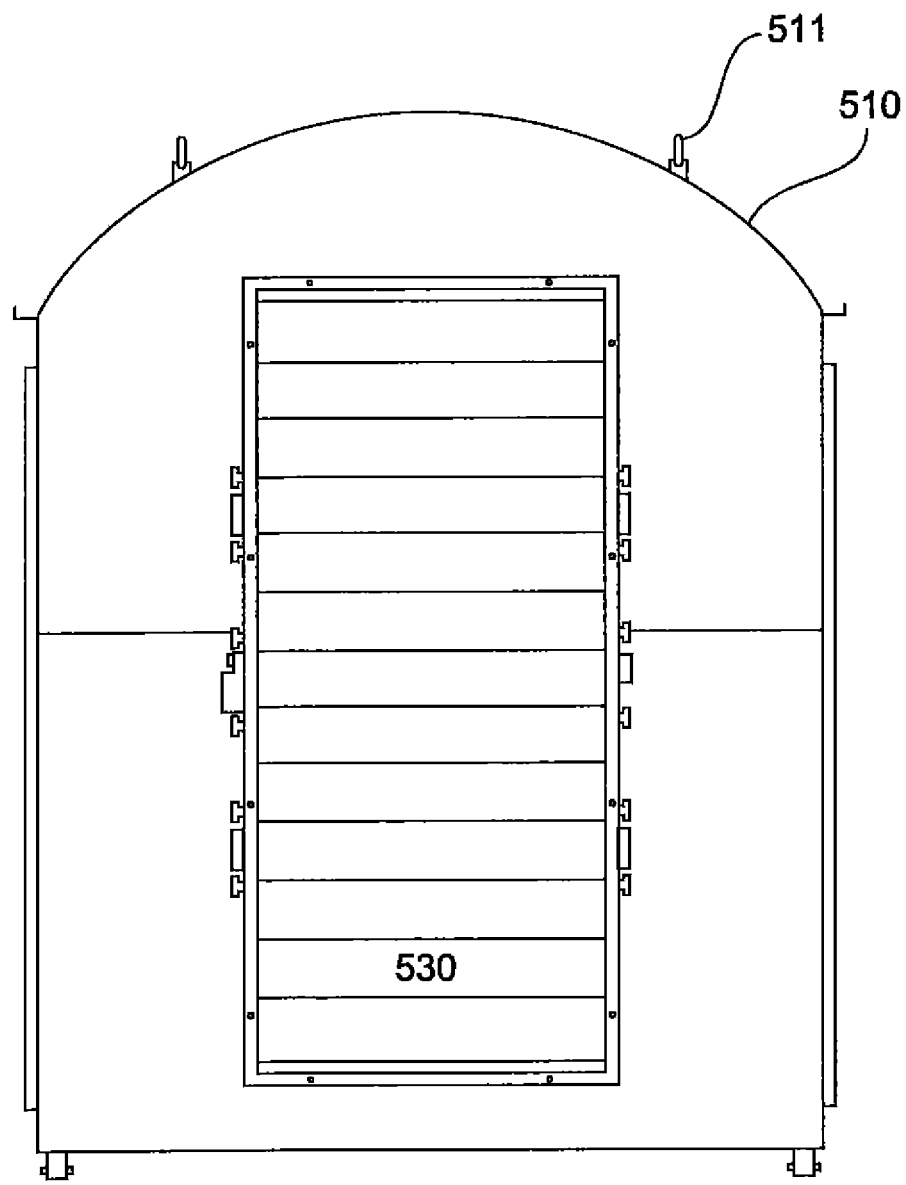
Figure 3E:
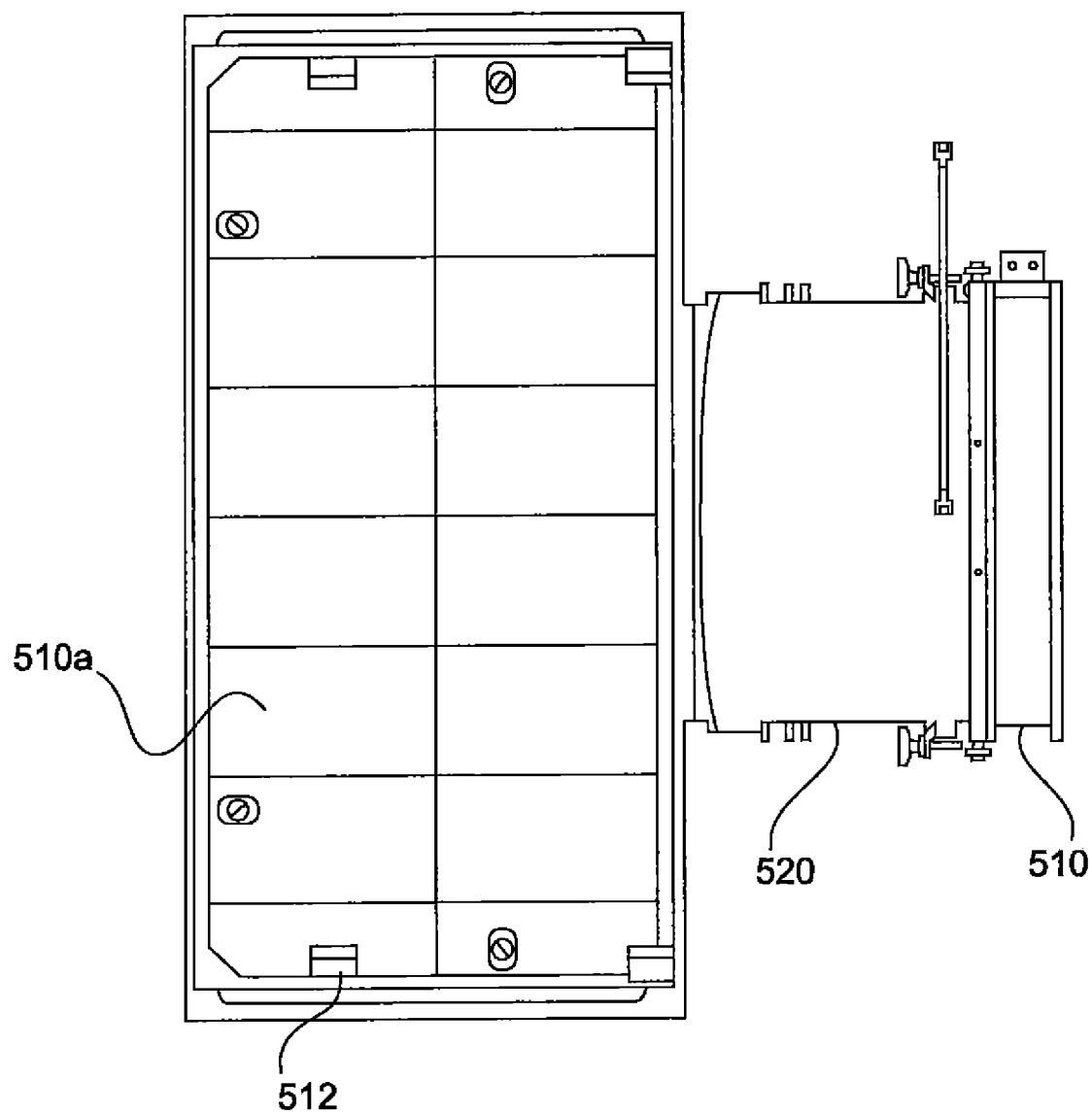
Figure 3F:
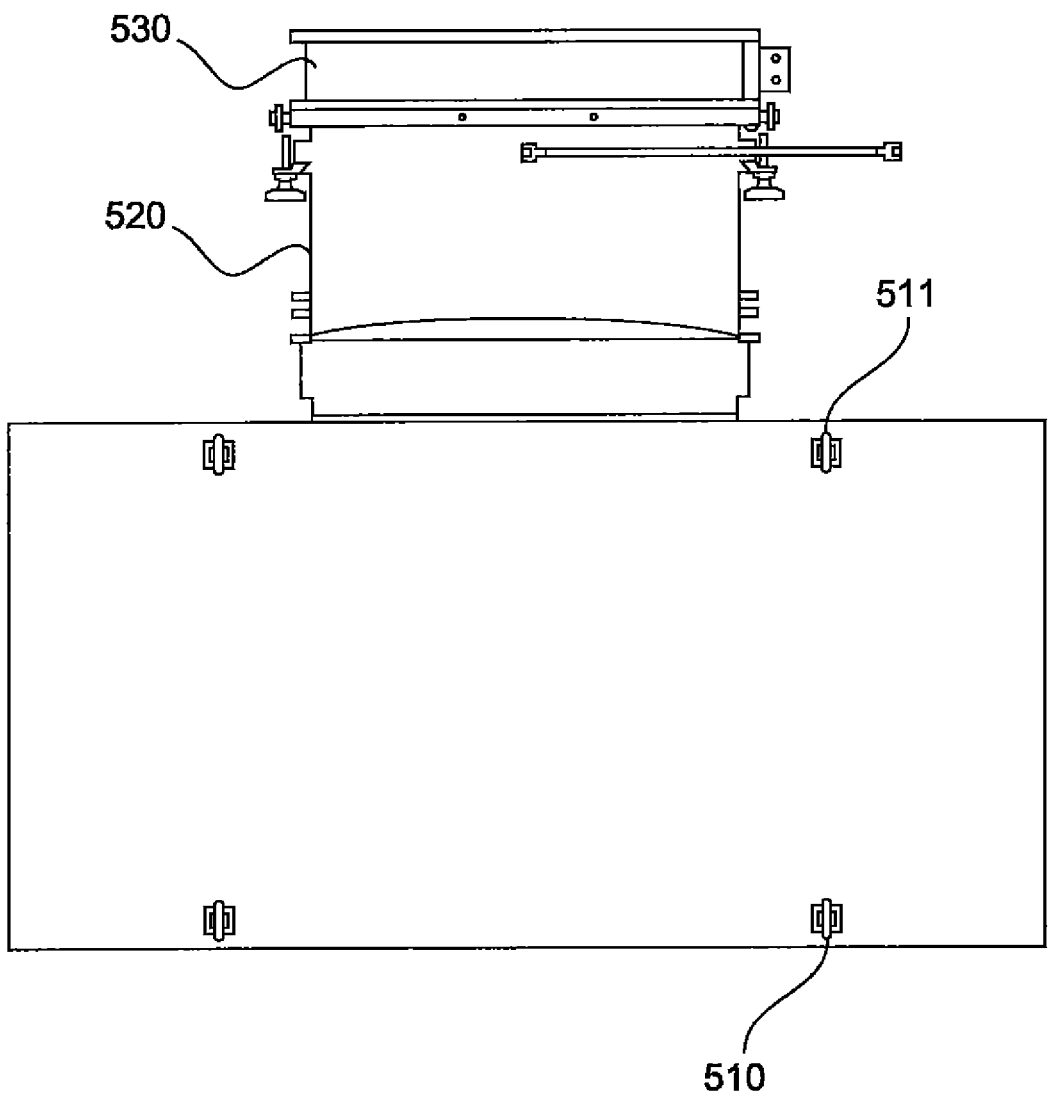
Figure 3G:
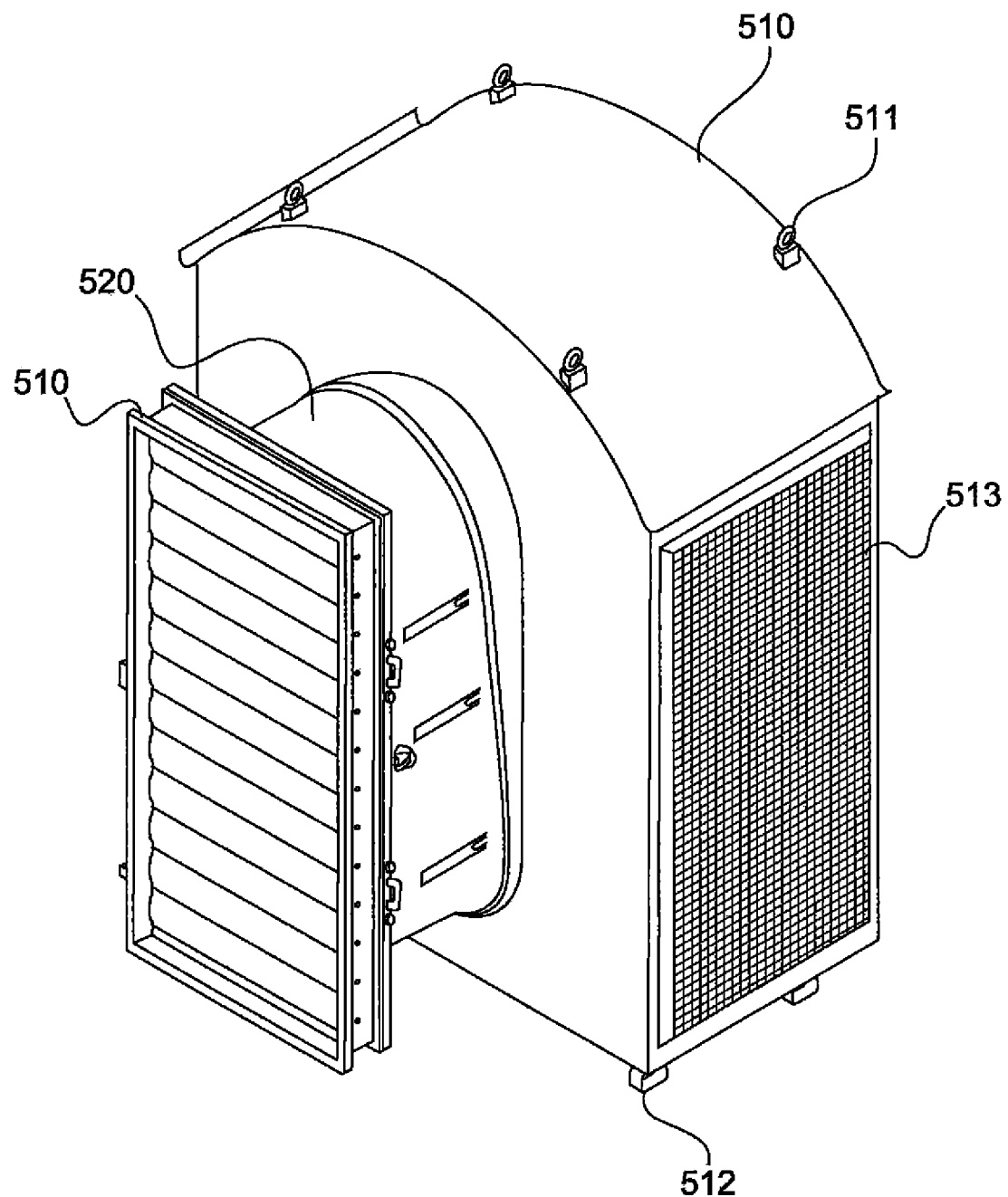
Figure 3H:
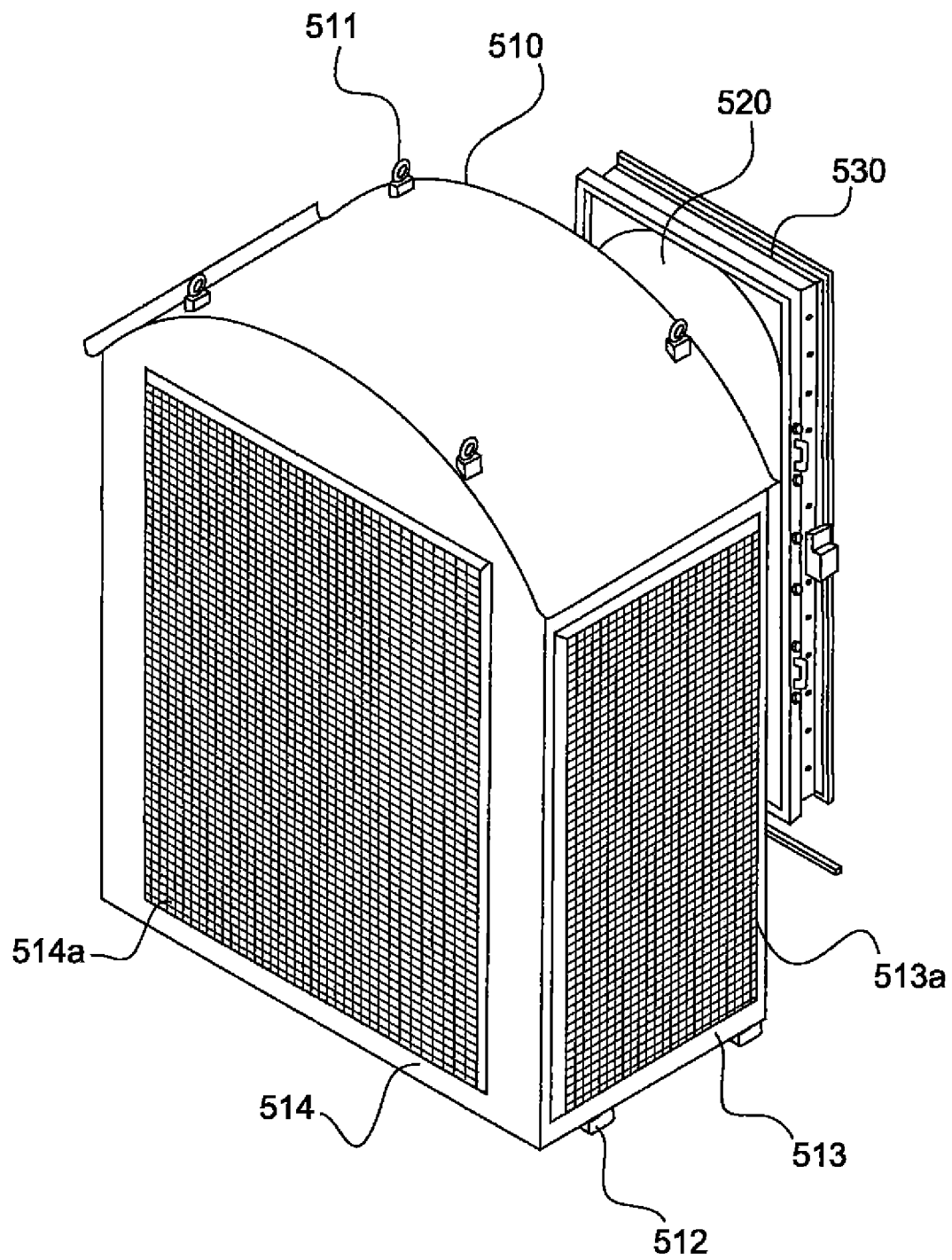
Figure 3I:
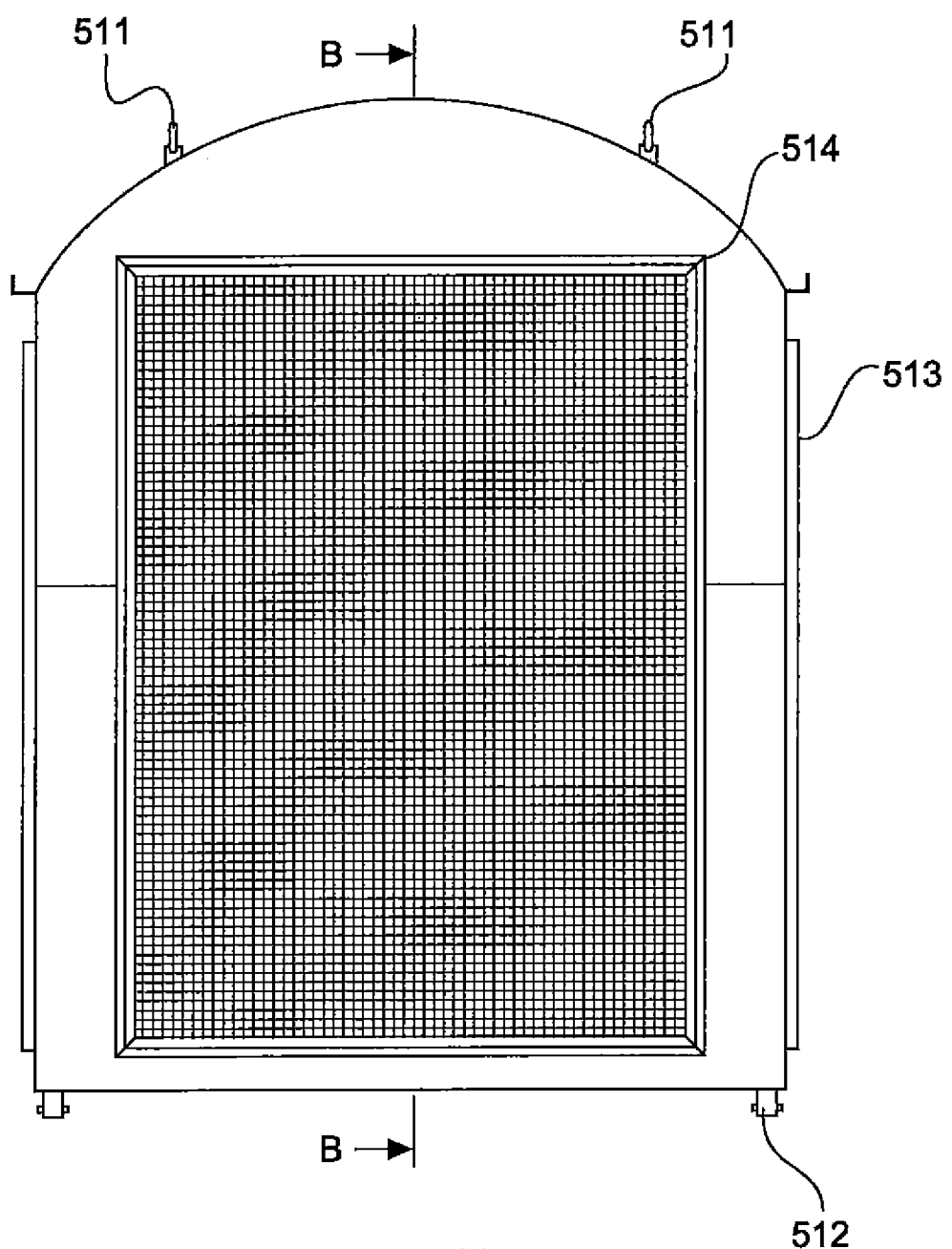
Figure 3J:
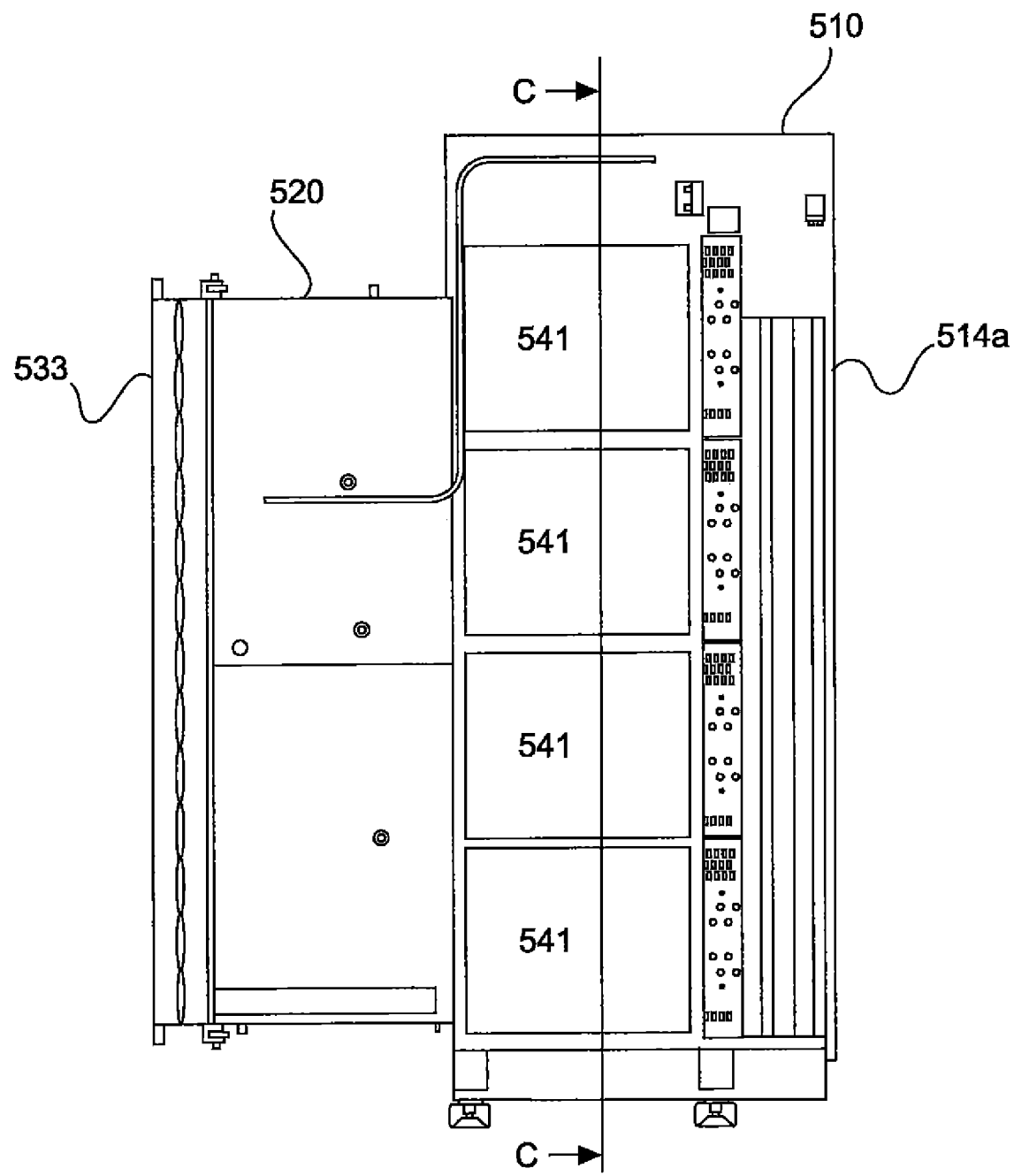
Figure 3K:
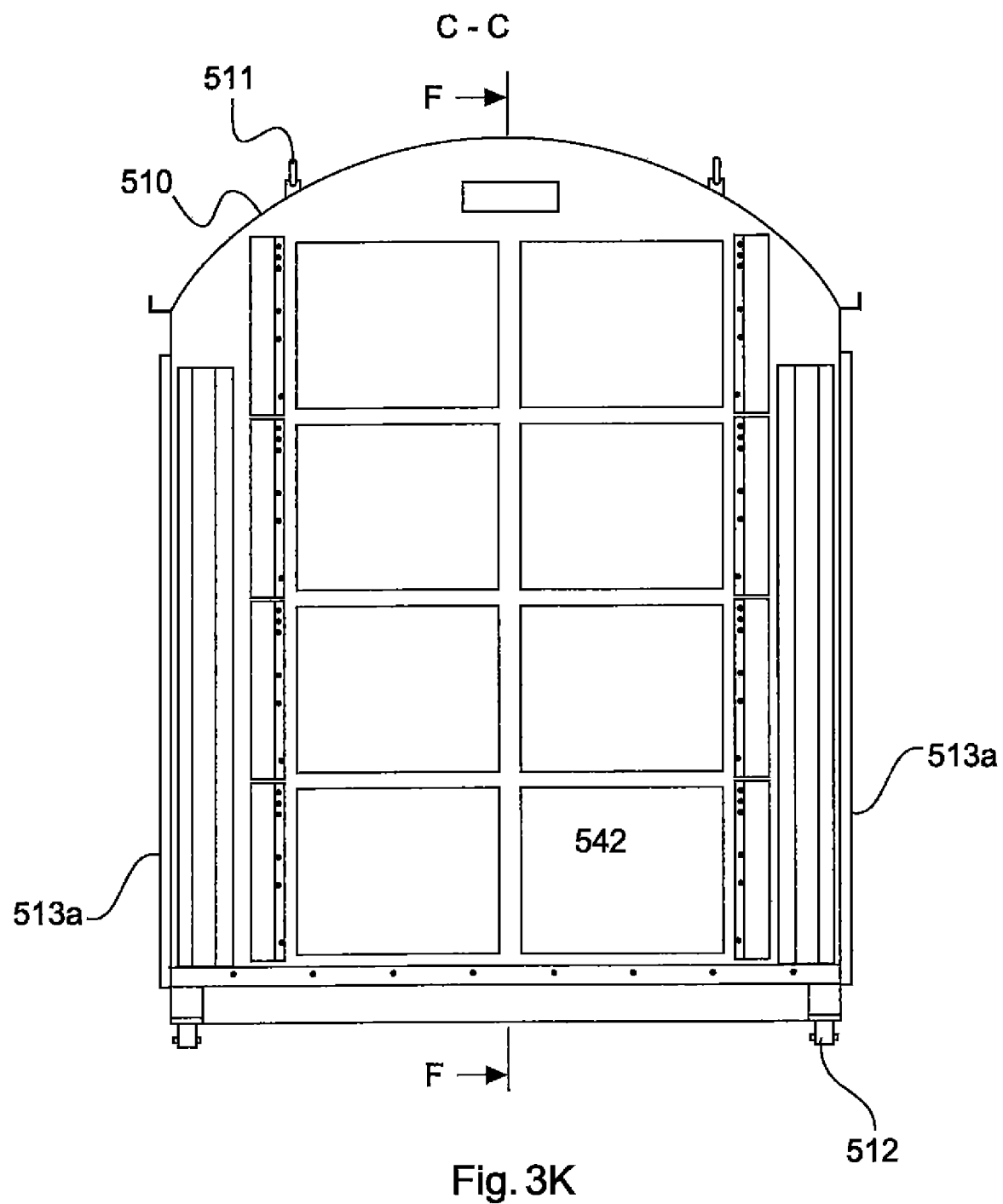
Figure 3L:
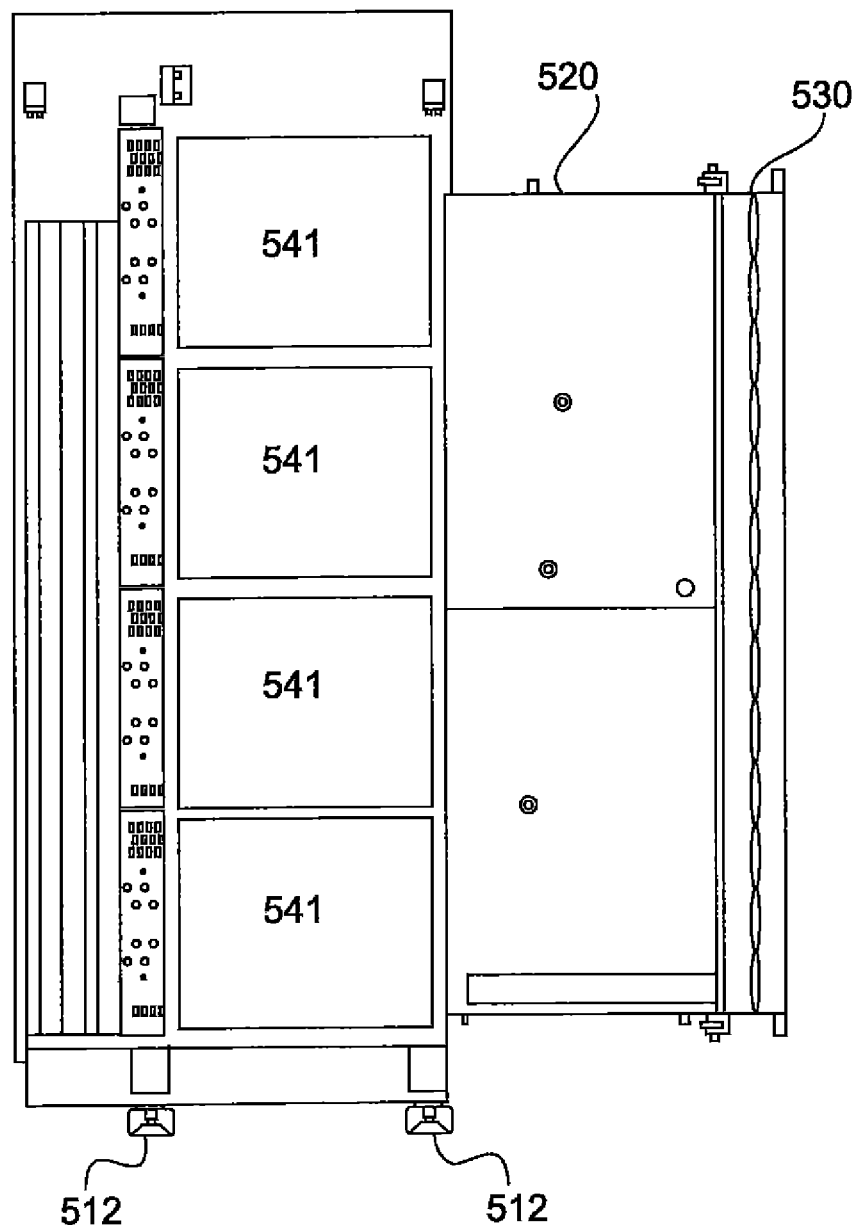
Figure 3M:
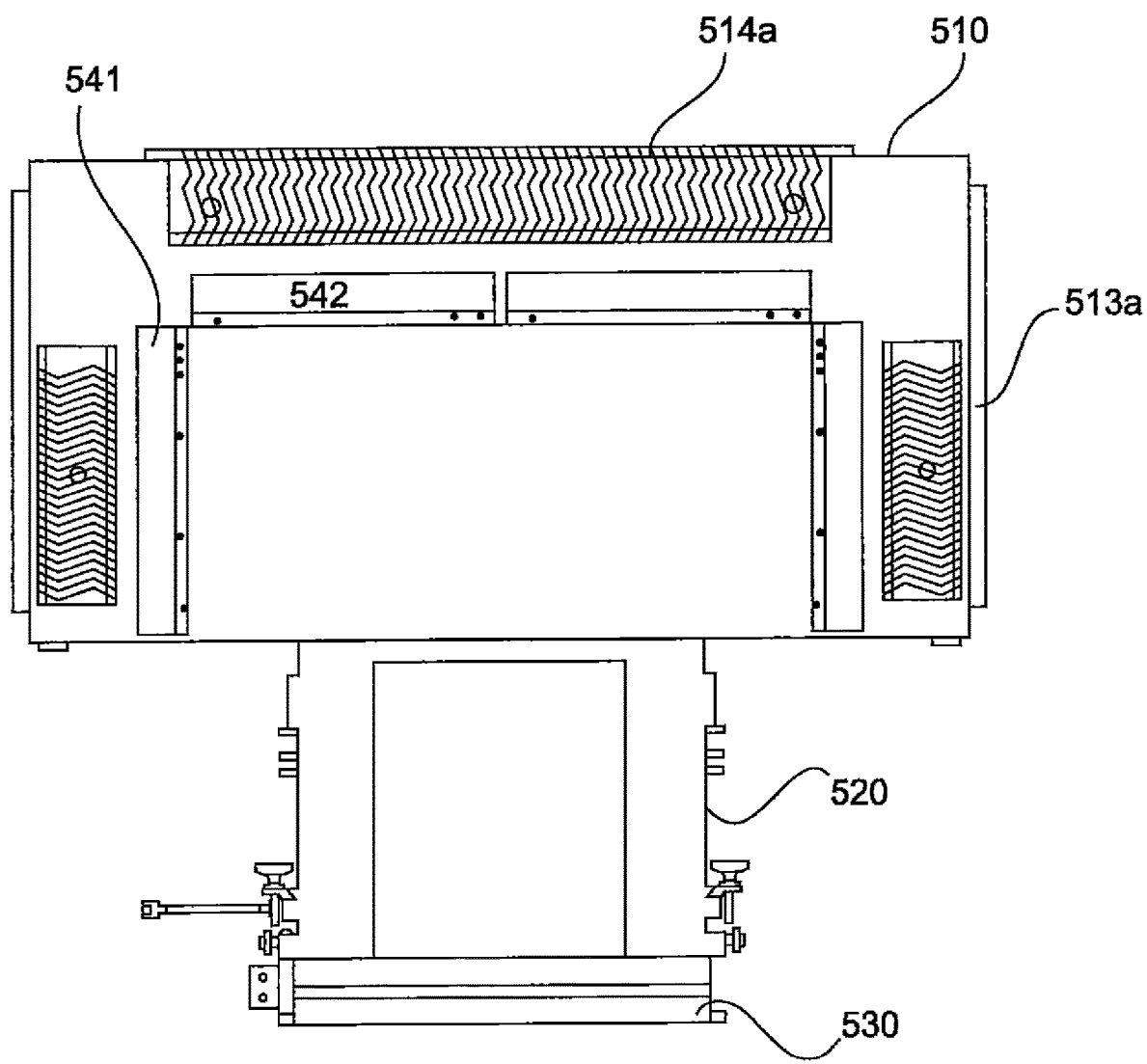
Figure 3N:
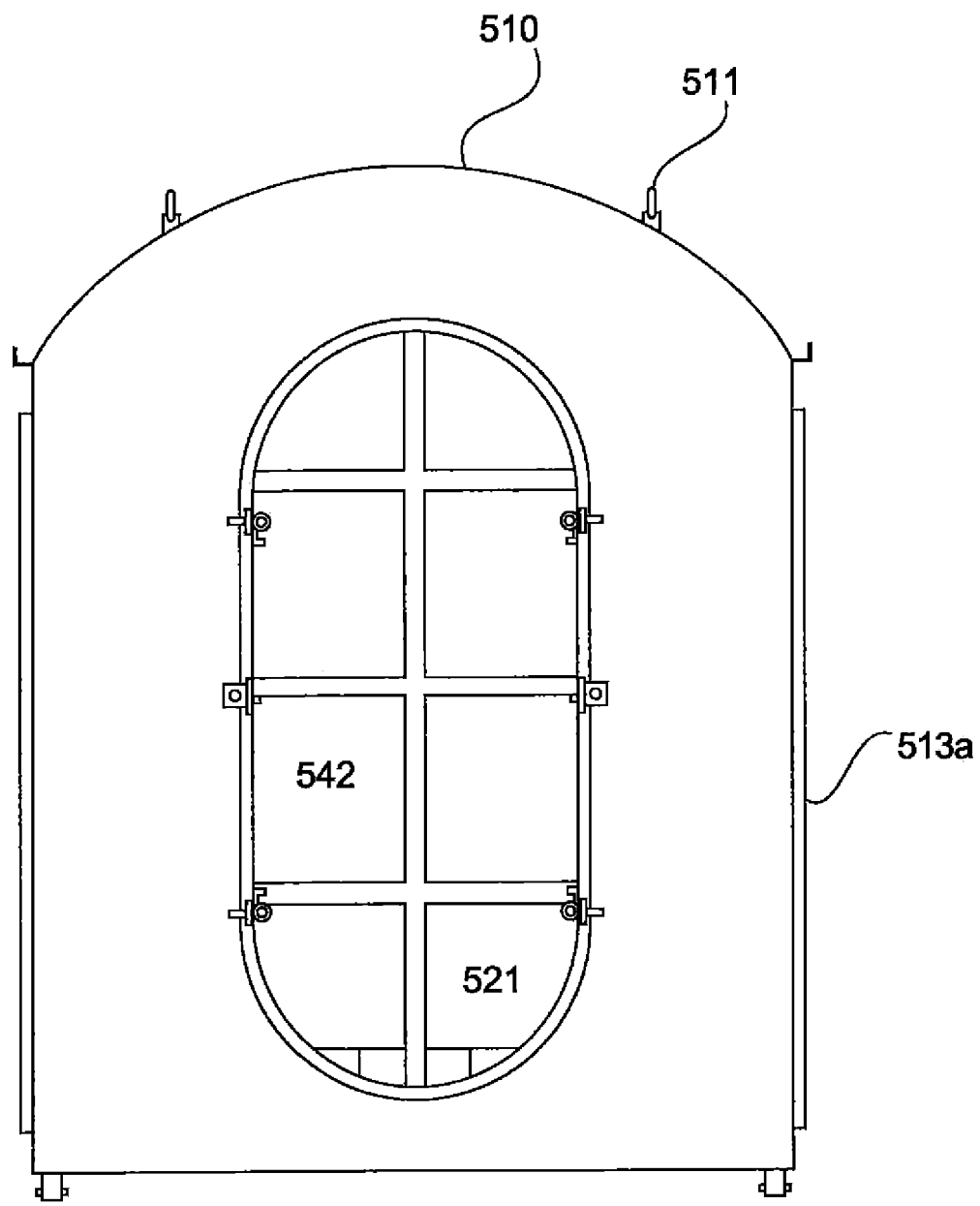
Figure 3O:
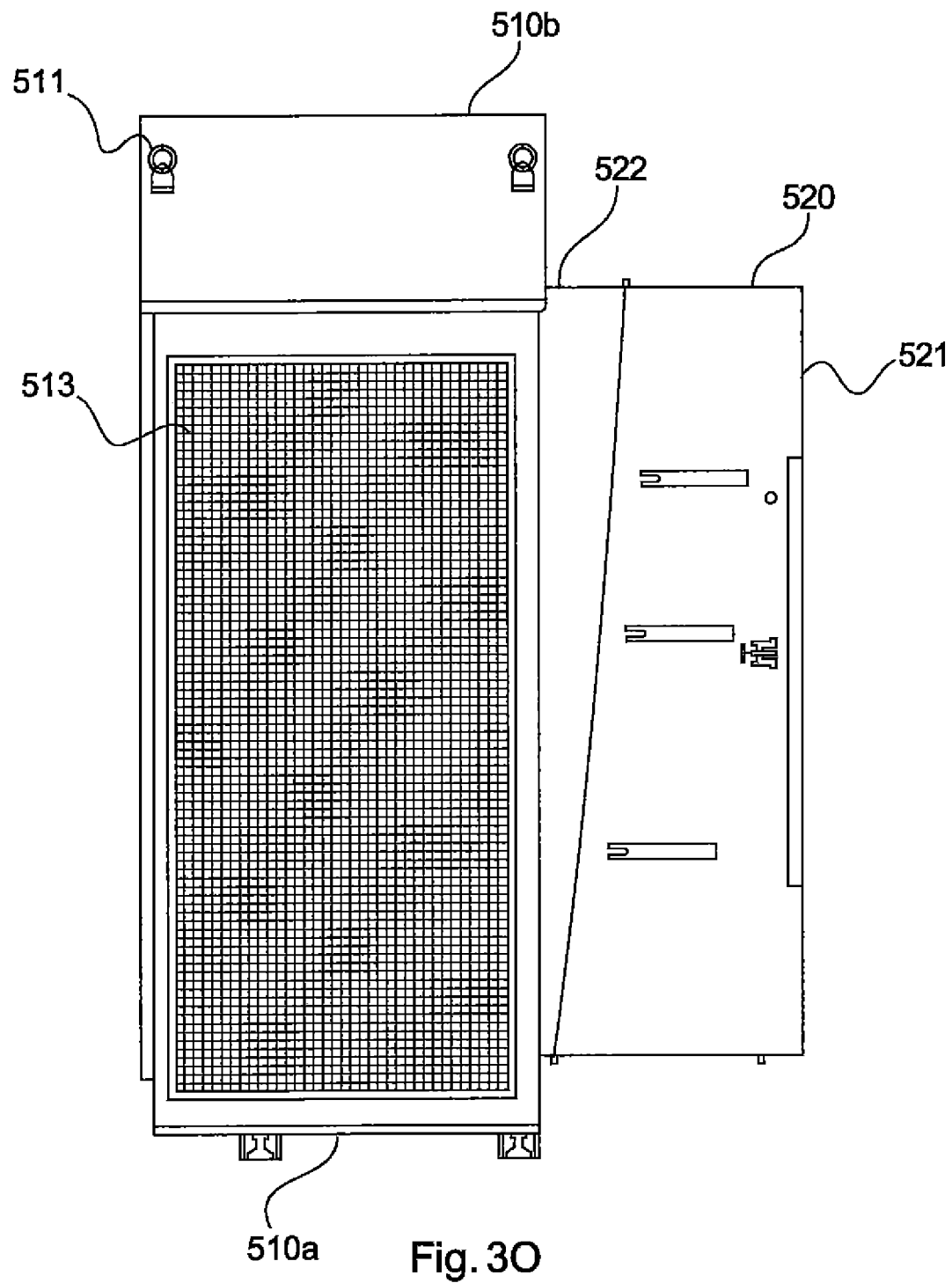

FIGS. 3N and 3O each show a view of the air feed unit, wherein the shutter unit is not installed.

Figure 3P:
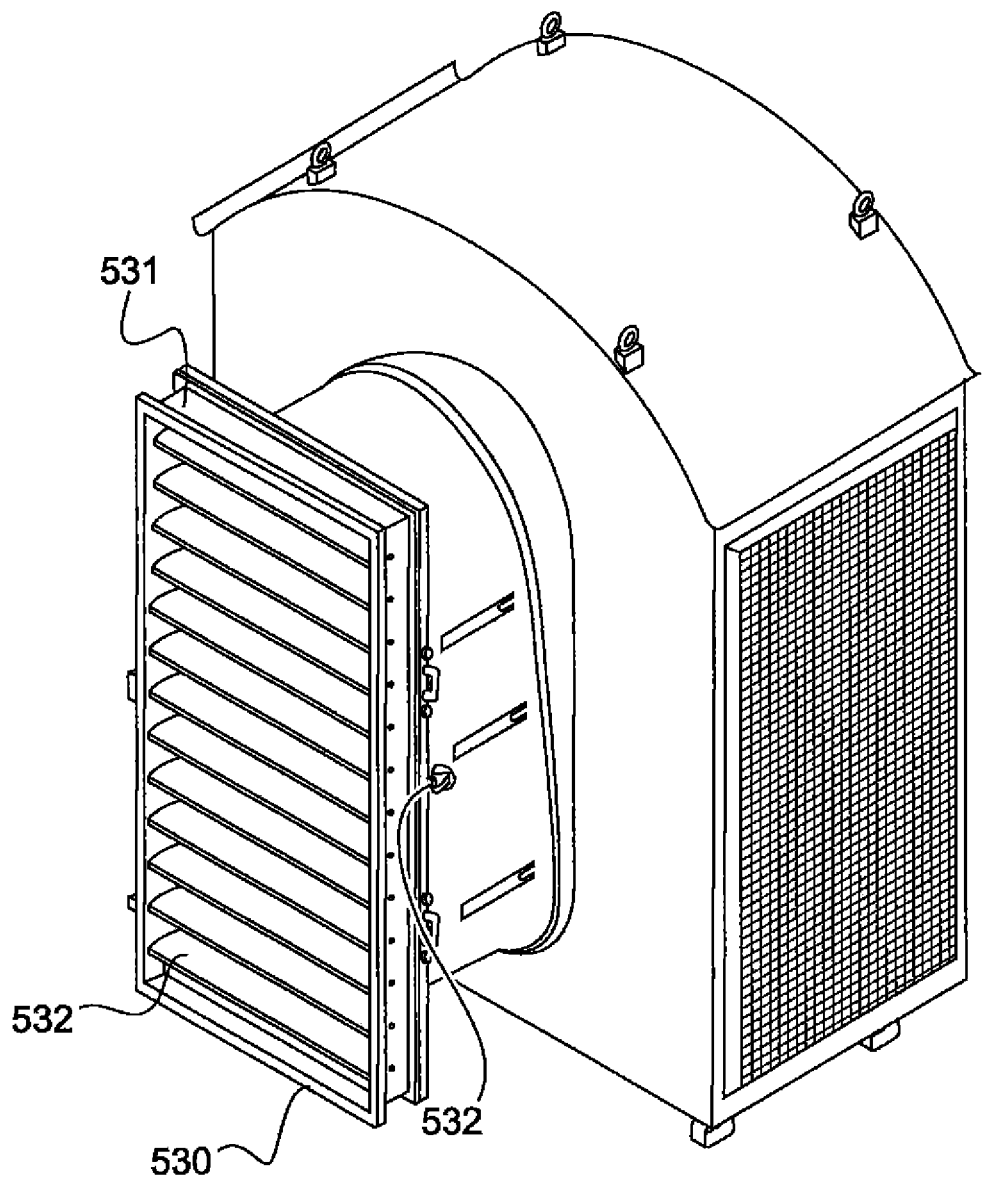

FIG. 3P shows a diagrammatic view of an air feed unit with the shutter unit 530, with the shutter flaps 532 being open.

The air inlet unit 500 can be introduced from the outside into an opening in a wall of the tower 200 (for example when the shutter unit 530 is removed). The central portion 520 can have a plurality of fixing units 525, by means of which the central portion 520 can be fixed or screwed firmly to the tower wall from the interior of the tower wall. That fixing is so designed that it cannot be released from the exterior. Thus the air feed unit 500 cannot be dismantled from outside the tower wall.

The protective grids 513a, 514a can have solid bars which are welded and involve for example a mesh width of <100×100 mm.

FIGS. 4A to 4H each show an outside view of an air outlet unit according to a second embodiment. The air outlet unit 600 can be in the form of an air feed cowl and the air outlet unit 600 has a shutter unit 630, a central portion 620 and an outer portion 610. In the installed condition the outer portion 610 is disposed outside the wall of the tower of the wind turbine. In the installed condition the central portion 620 is disposed within the wall of the tower 200 of the wind turbine and the shutter unit 630 projects into the interior of the tower of the wind turbine. The outer portion 610 has a bottom 610a and an upper portion 610b. Lifting eyes 611 for transport purposes can be provided in the upper portion 610b. Transport protection units 612 can be provided at the bottom 610a. The outer portion 610 has two side surfaces 613 and a front surface 614. The side surfaces 613 and the front surface 614 each have a completely welded protective grid 613a and 614a as intrusion and vandalism protection.

Adjusting feet 612 with a transport protection can be provided at the bottom 610a.

FIGS. 4I to 4M show various sectional views of the air outlet unit according to the second embodiment. Provided within the outer portion 610 or behind the protective grids 613, 614 is a protective grid 650 which comprises a plurality of welded steel or metal bars and is provided between the protective grids 613a, 614a and the central portion 620. The air filters 641, 642 can be riveted both to each other and also to the outer portion 610.

Figure 4A:
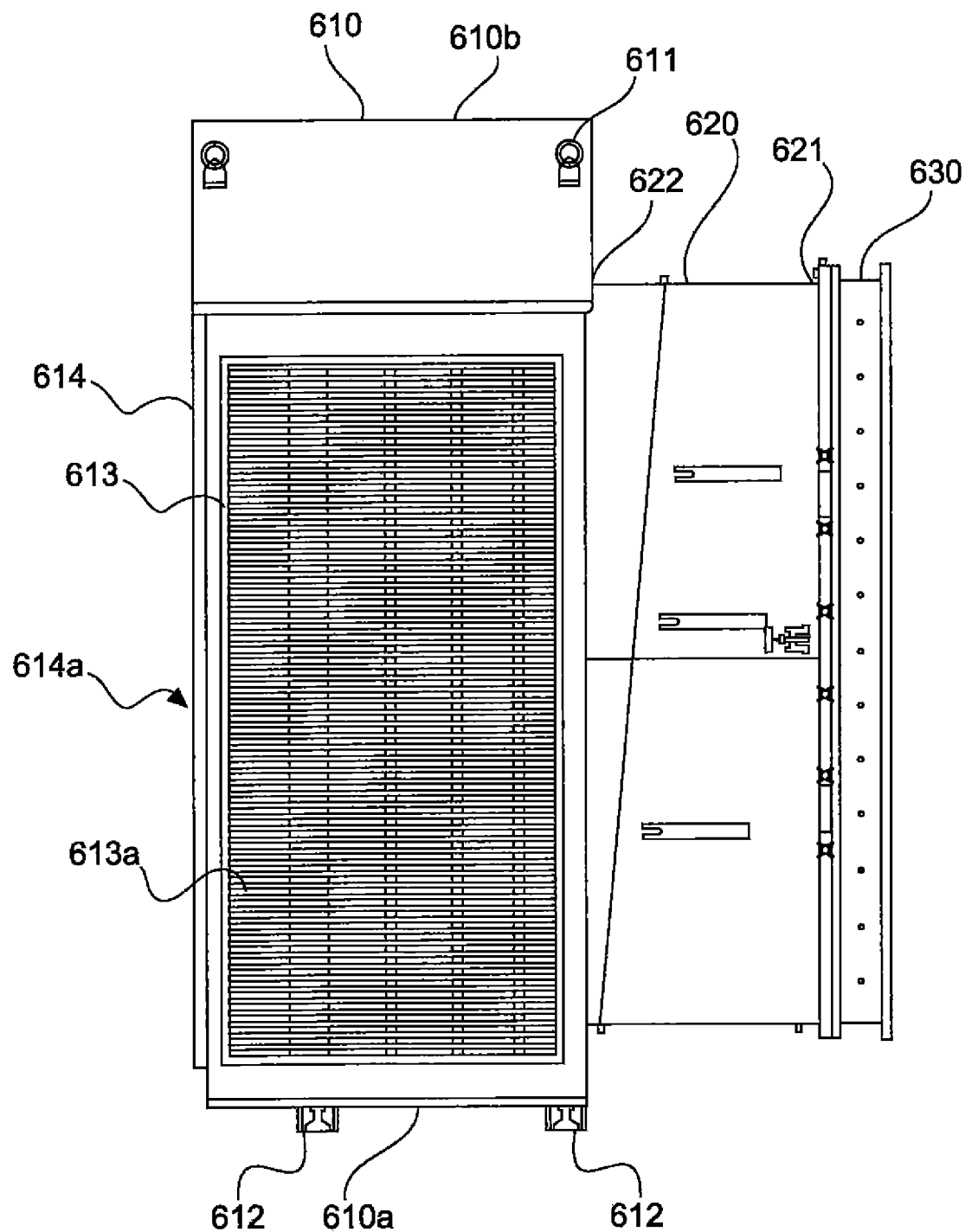
FIGS. 4A to 4Q show various views of an air outlet unit according to a second embodiment.
Figure 4B:
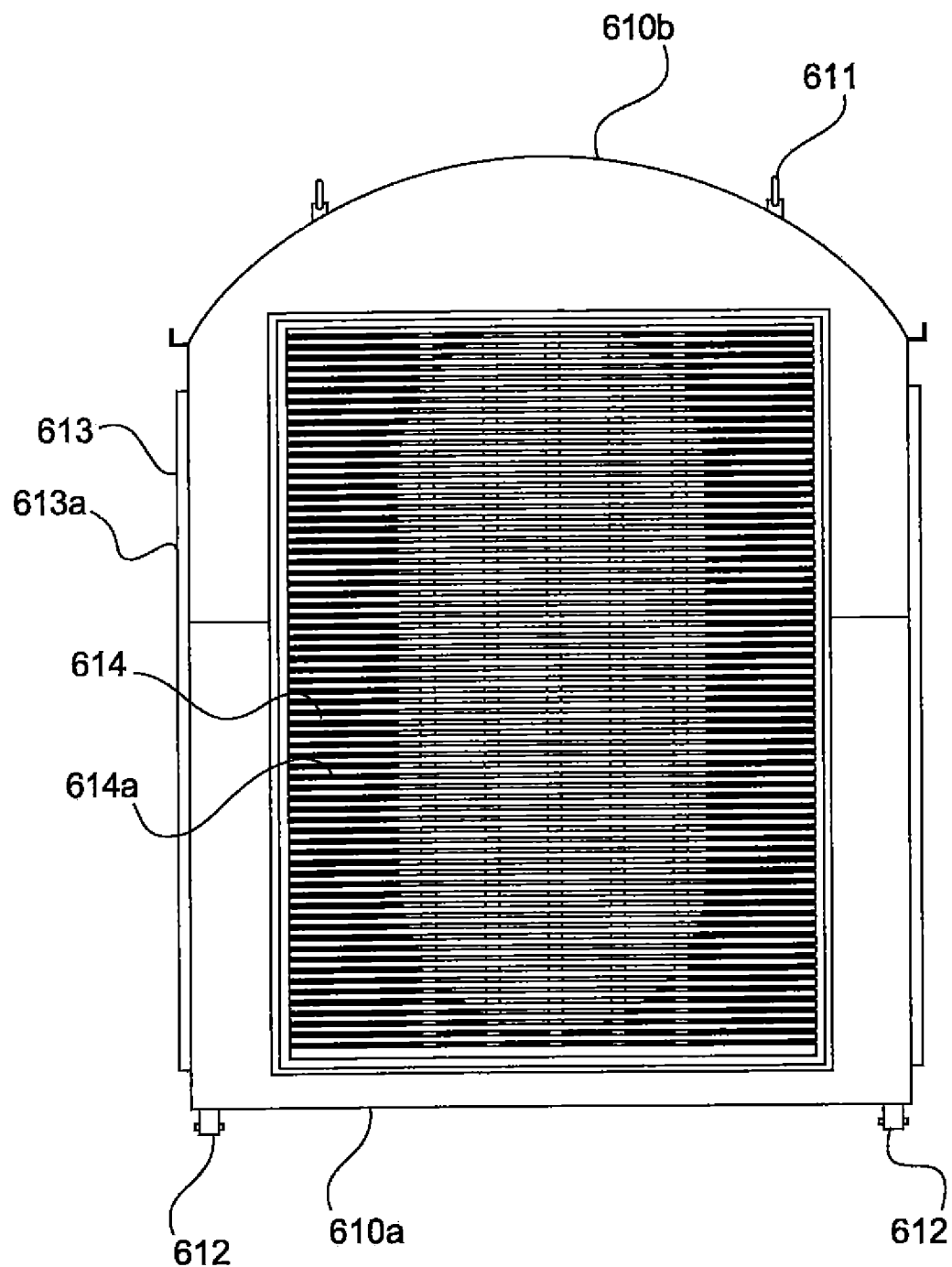
Figure 4C:
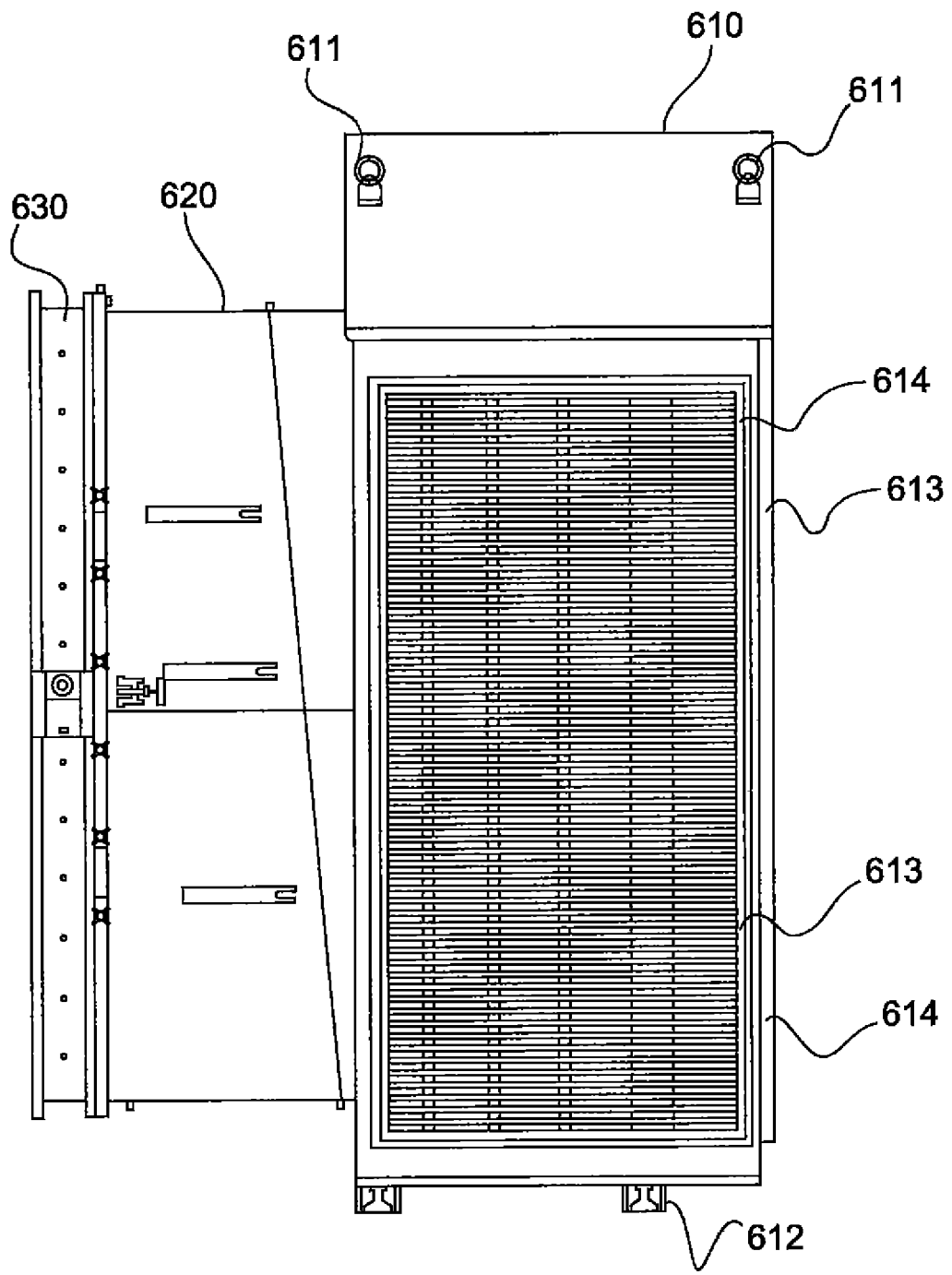
Figure 4D:
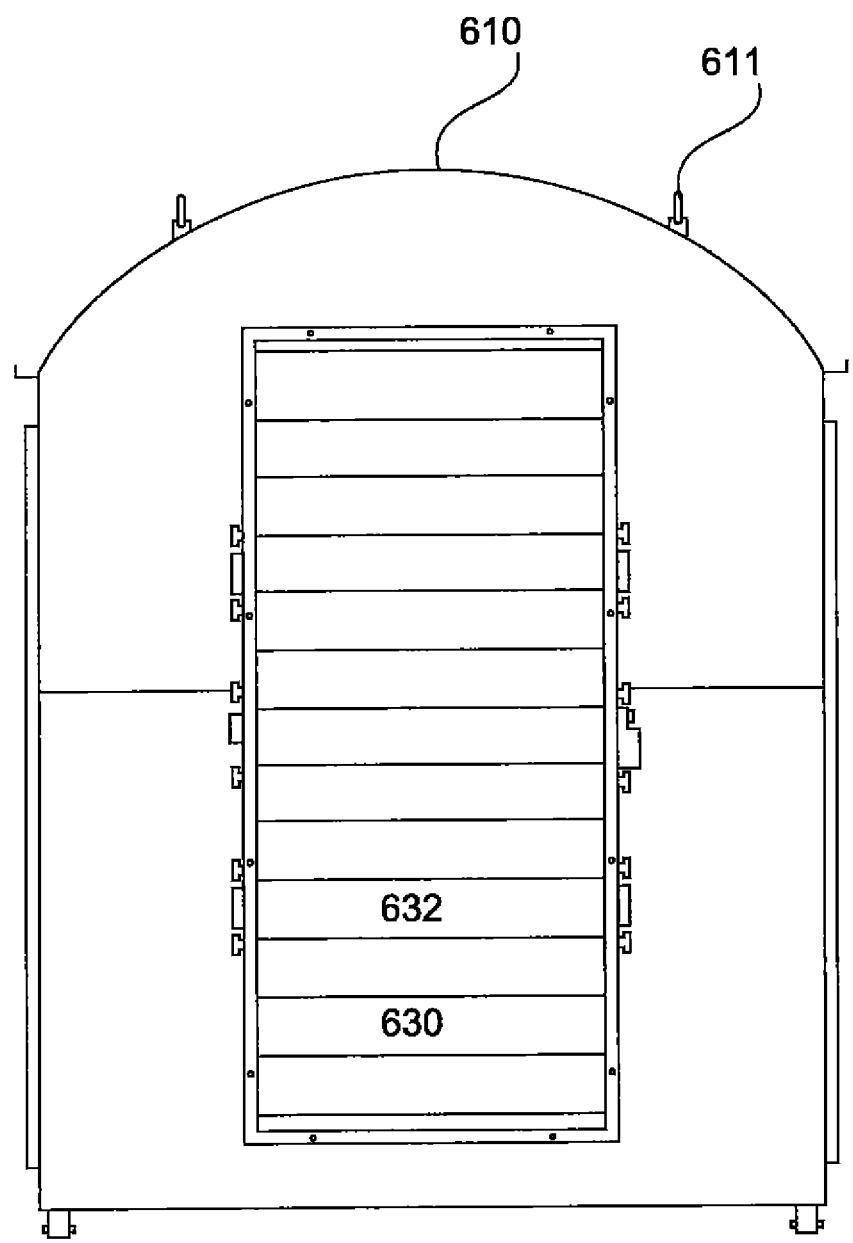
Figure 4E:
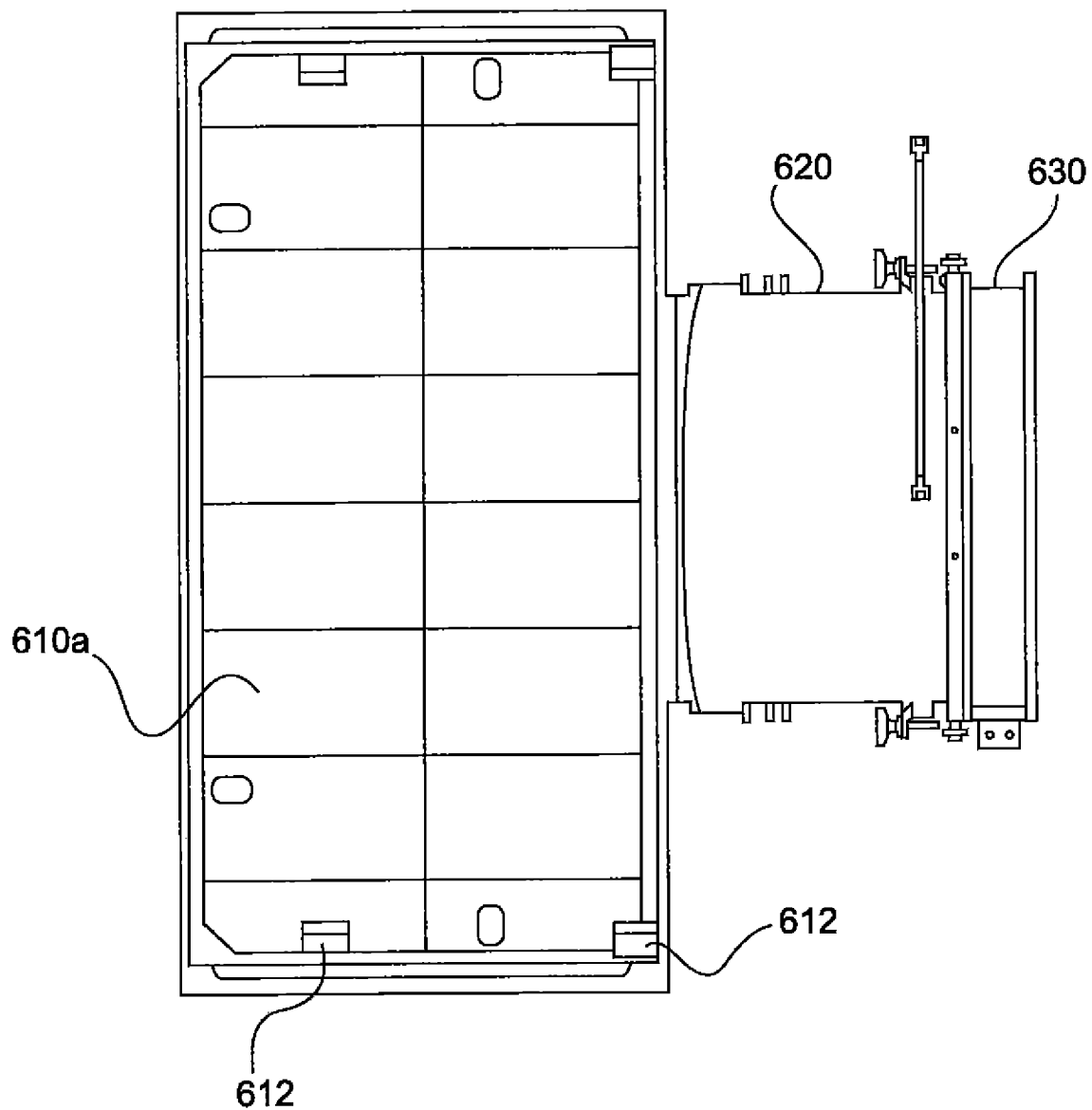
Figure 4F:
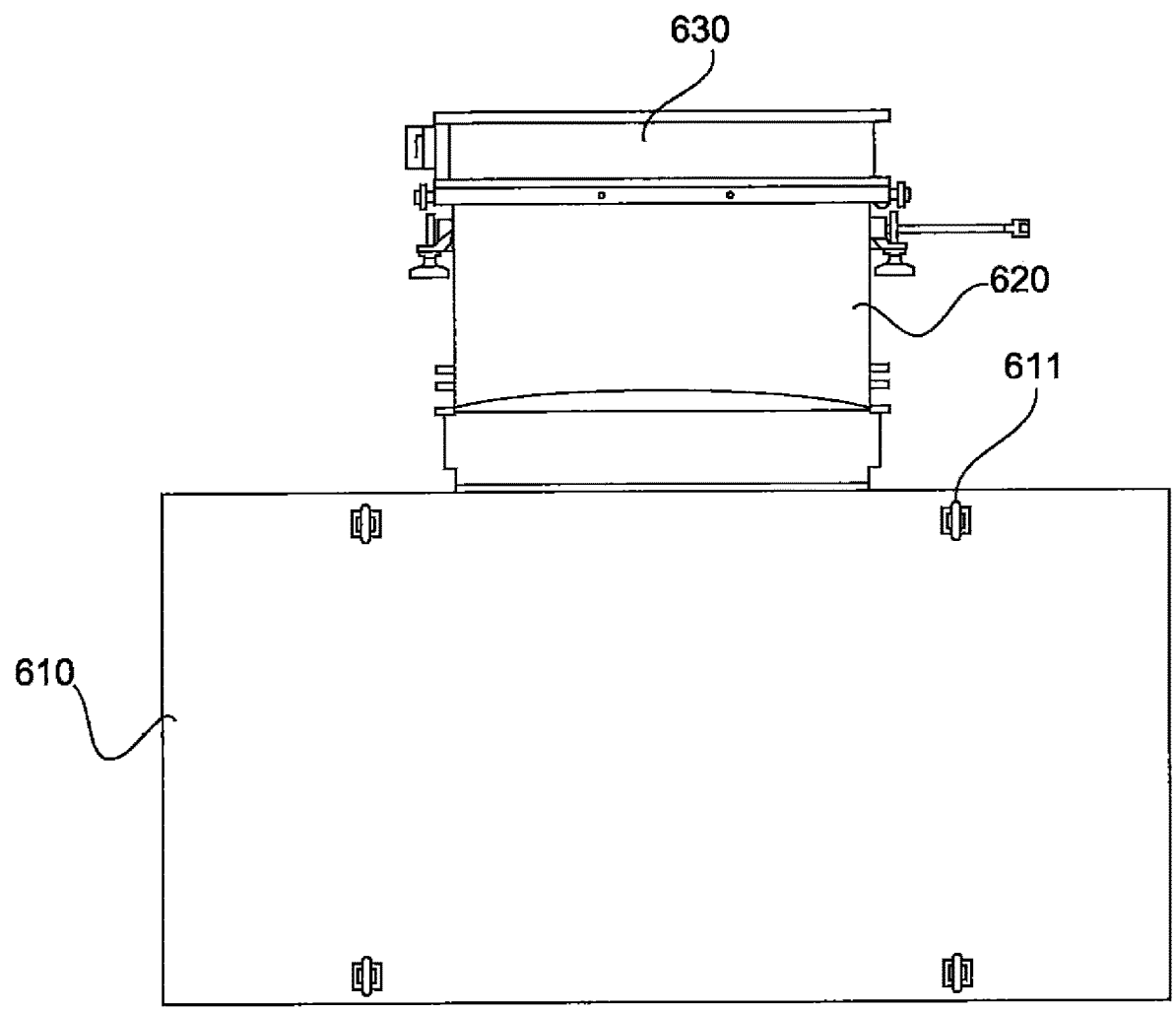
Figure 4G:
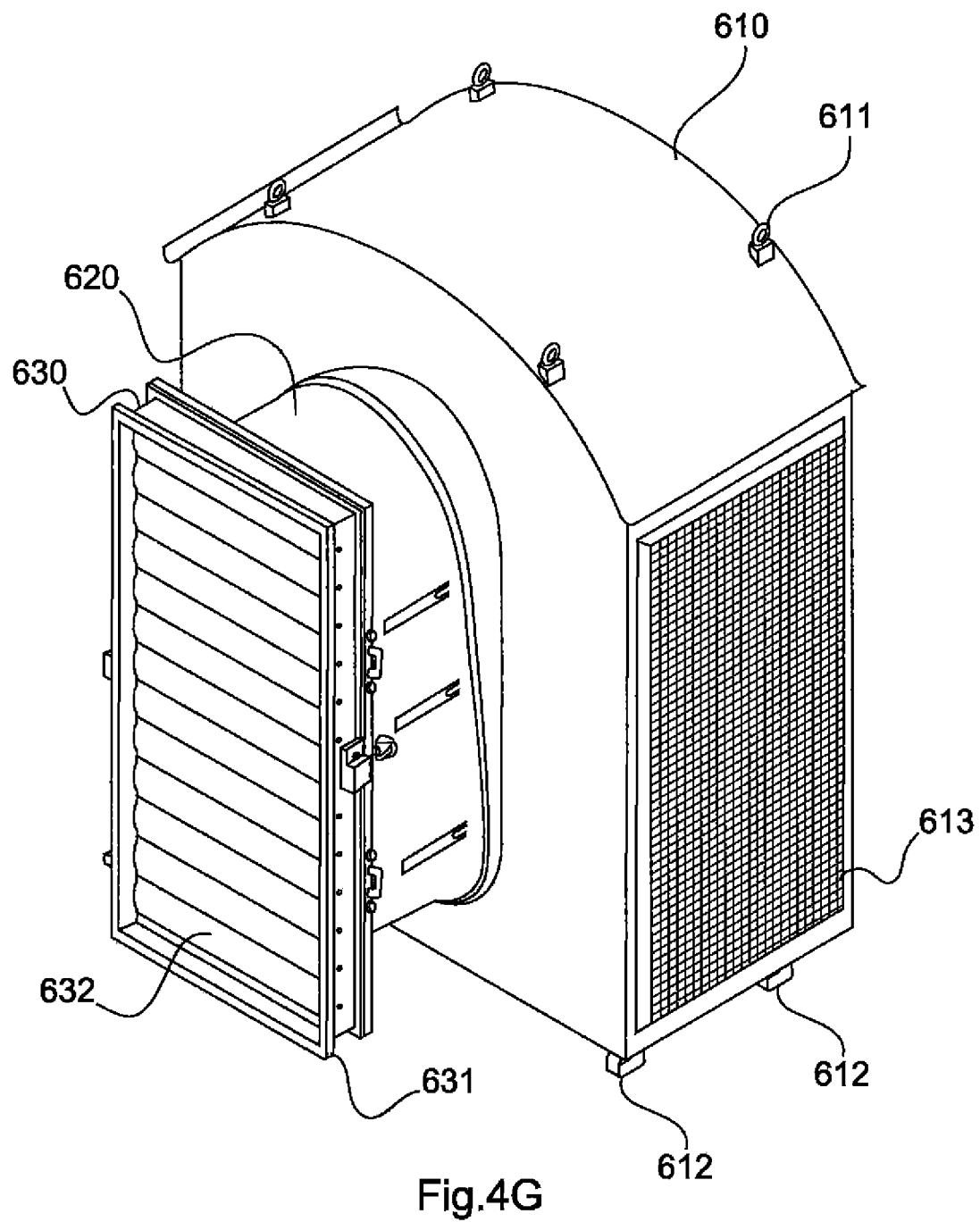
Figure 4H:
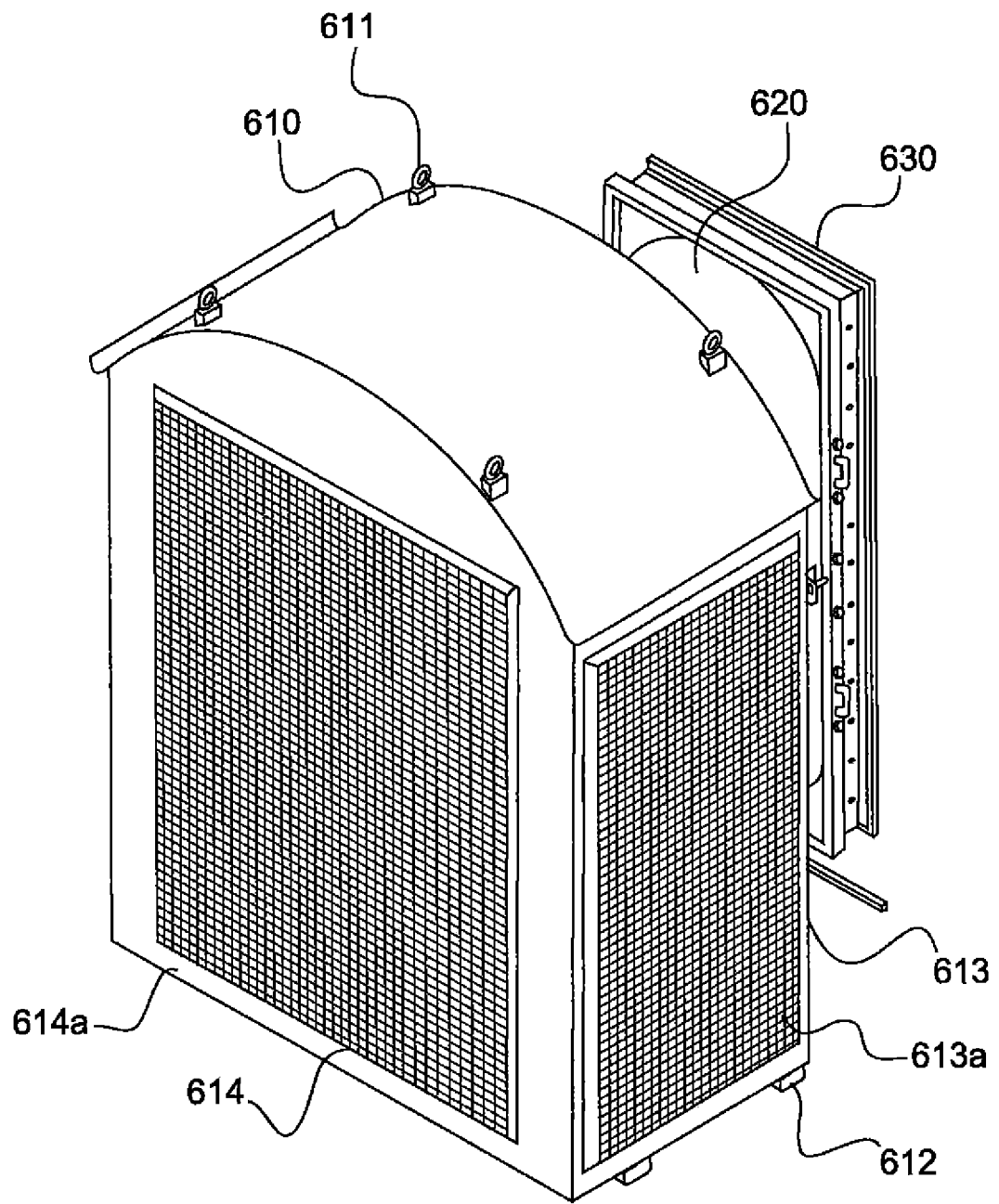
Figure 4I:
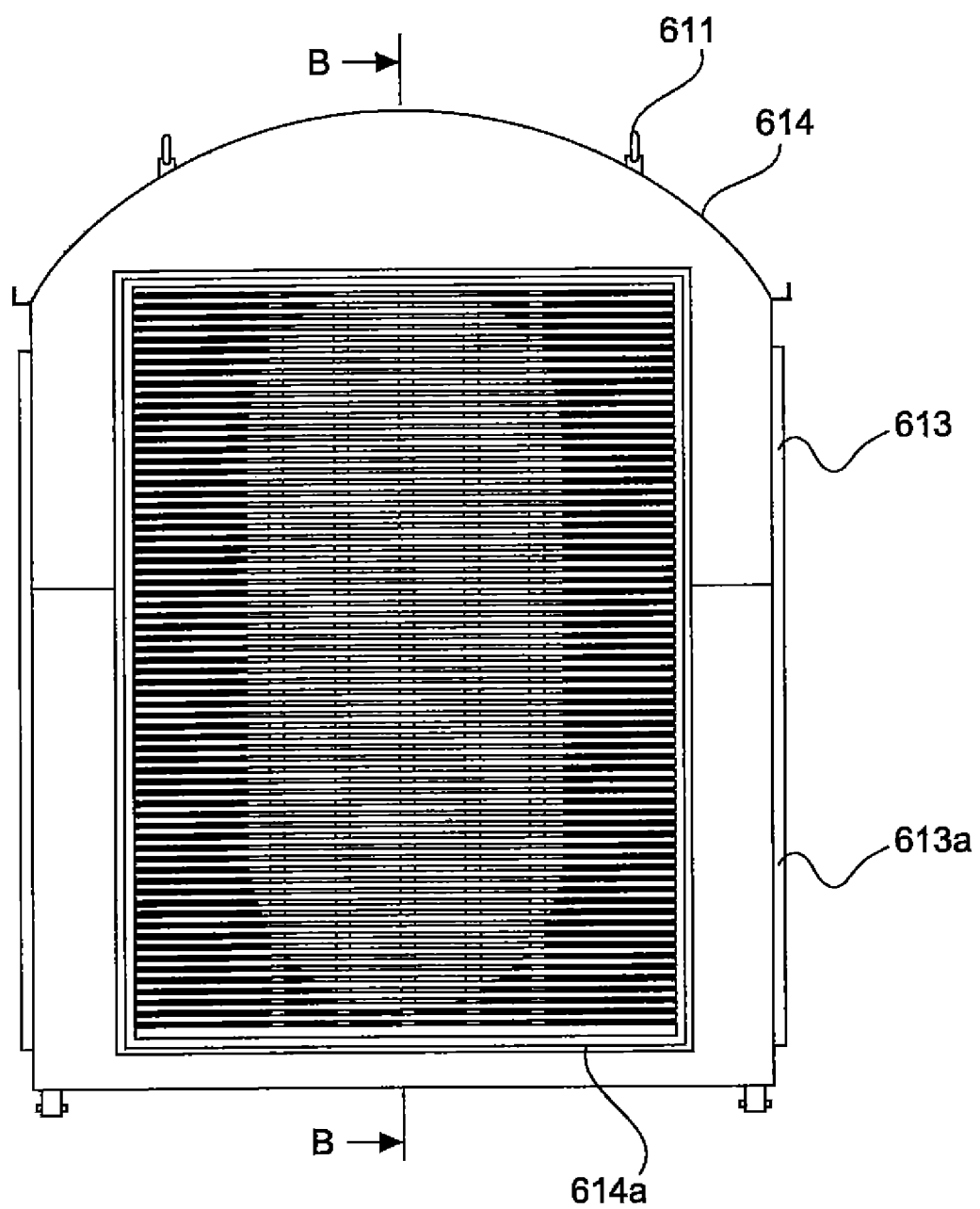
Figure 4J:
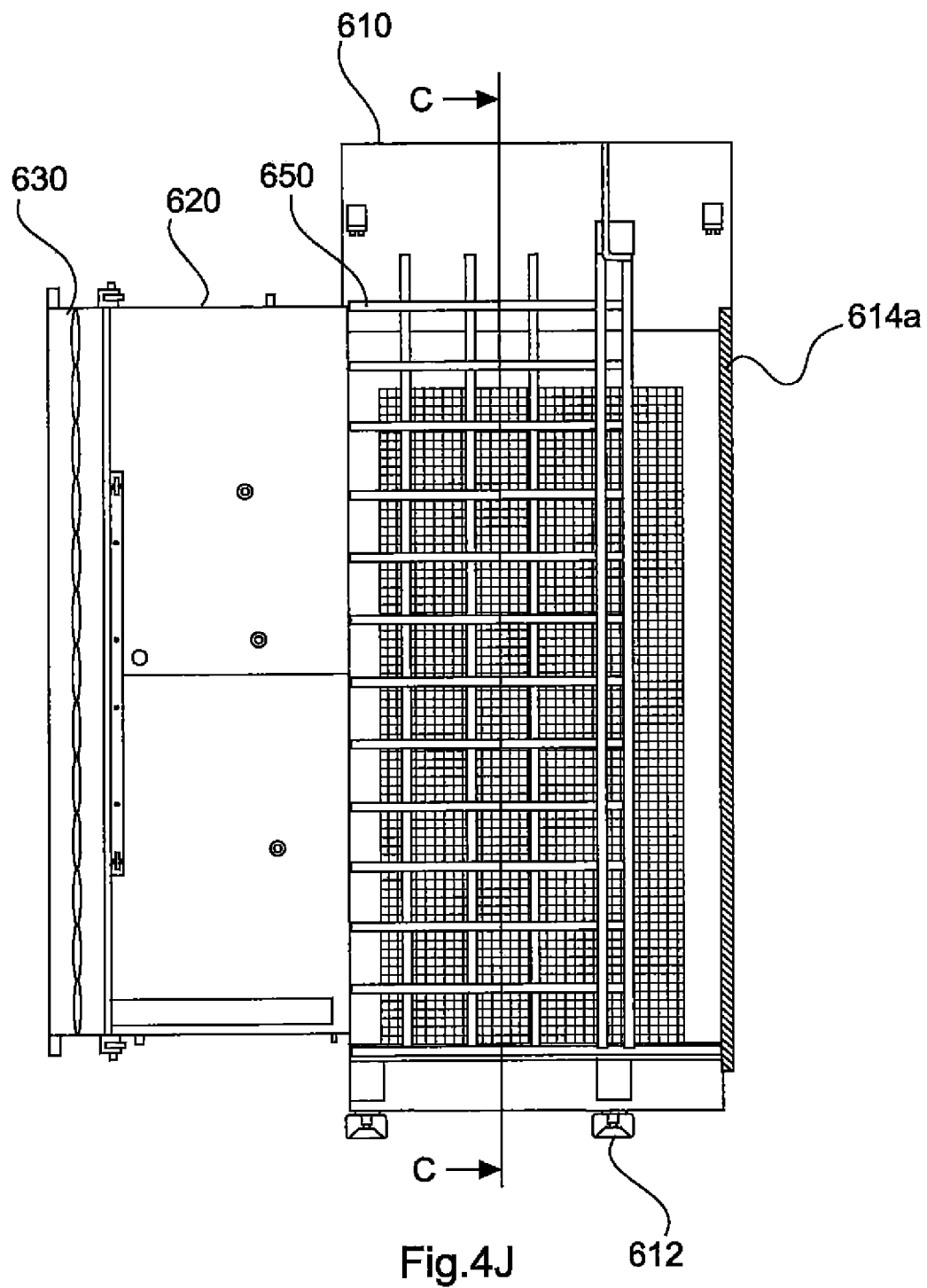
Figure 4K:
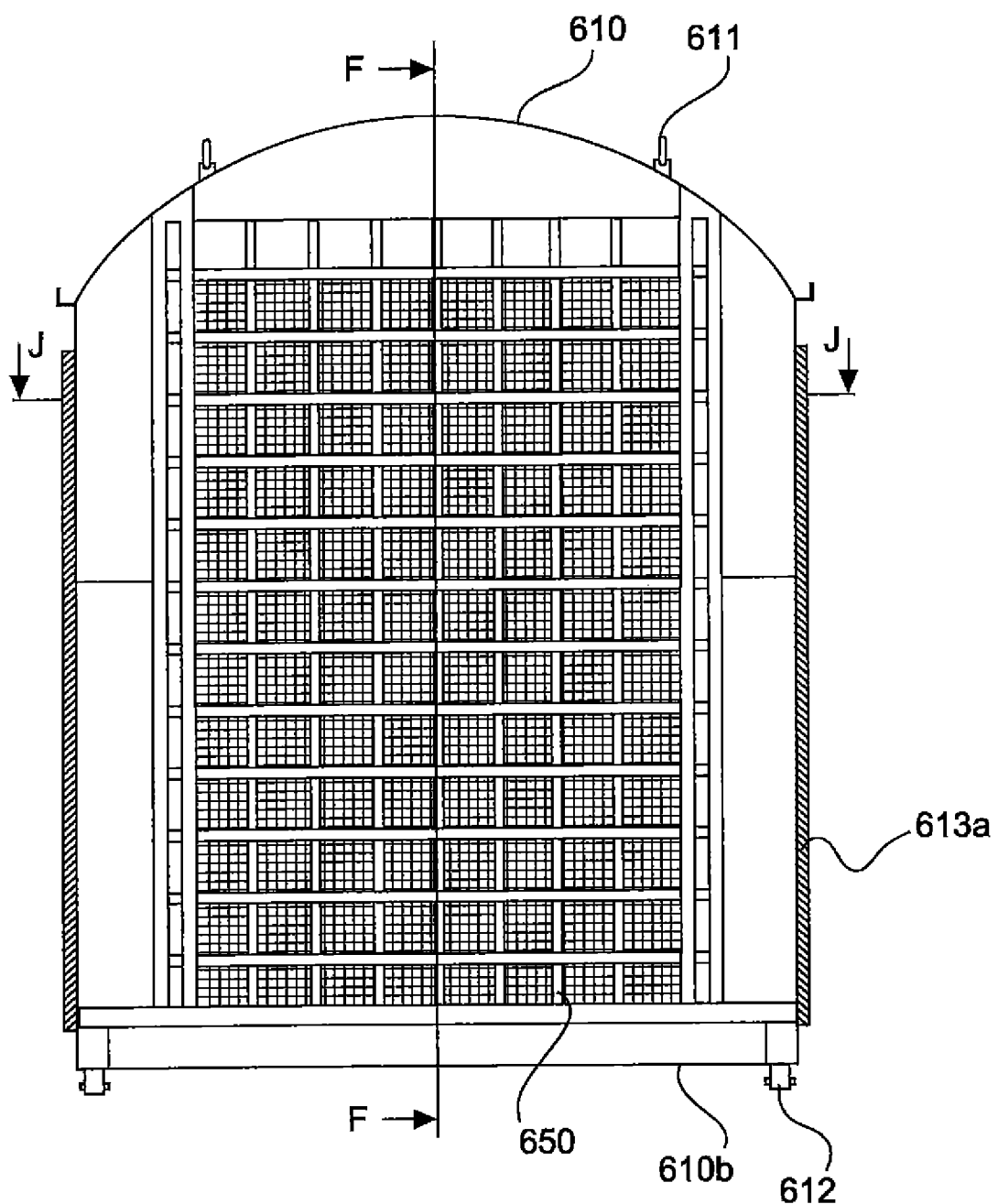
Figure 4L:
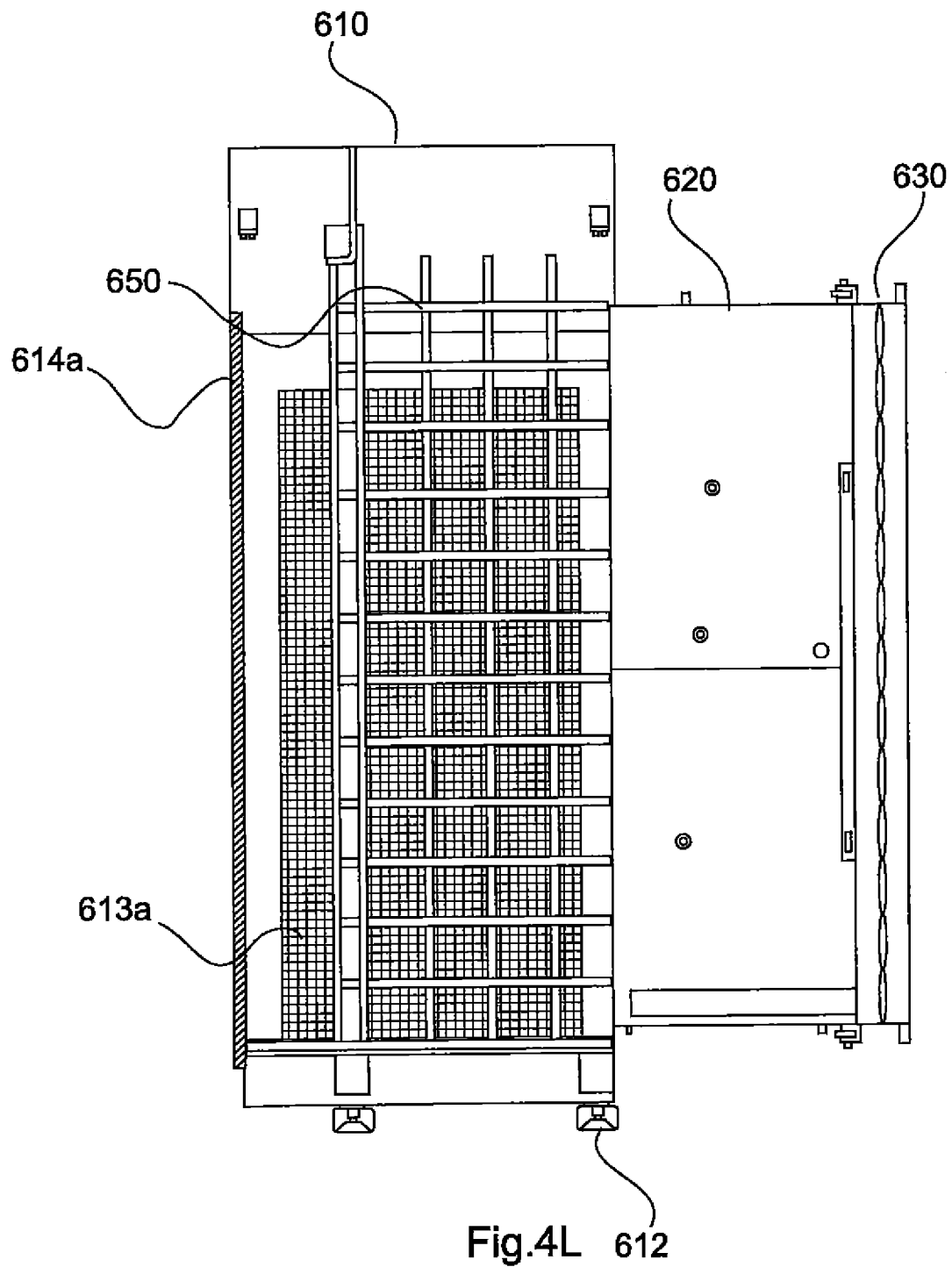
Figure 4M:
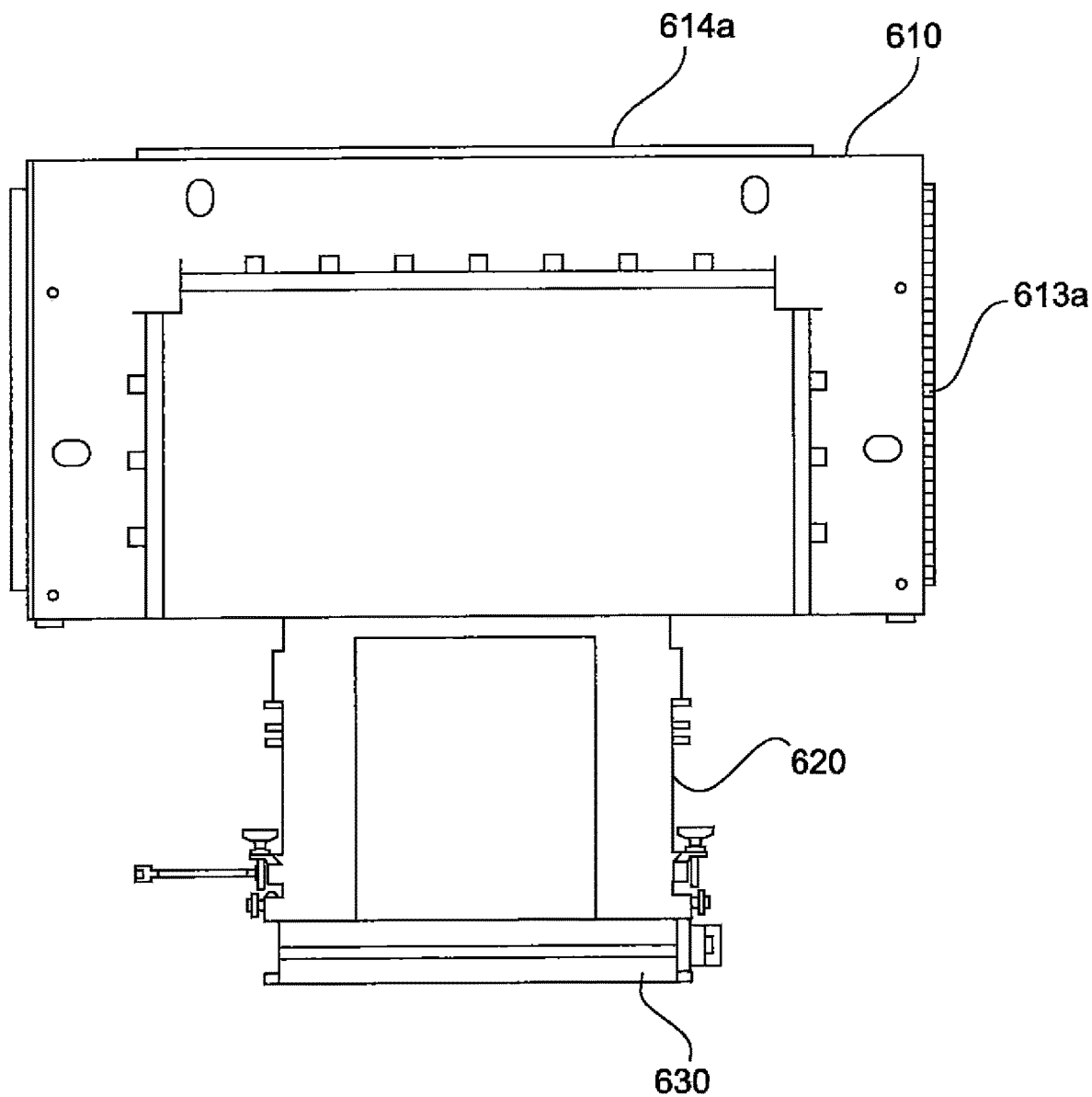
Figure 4N:
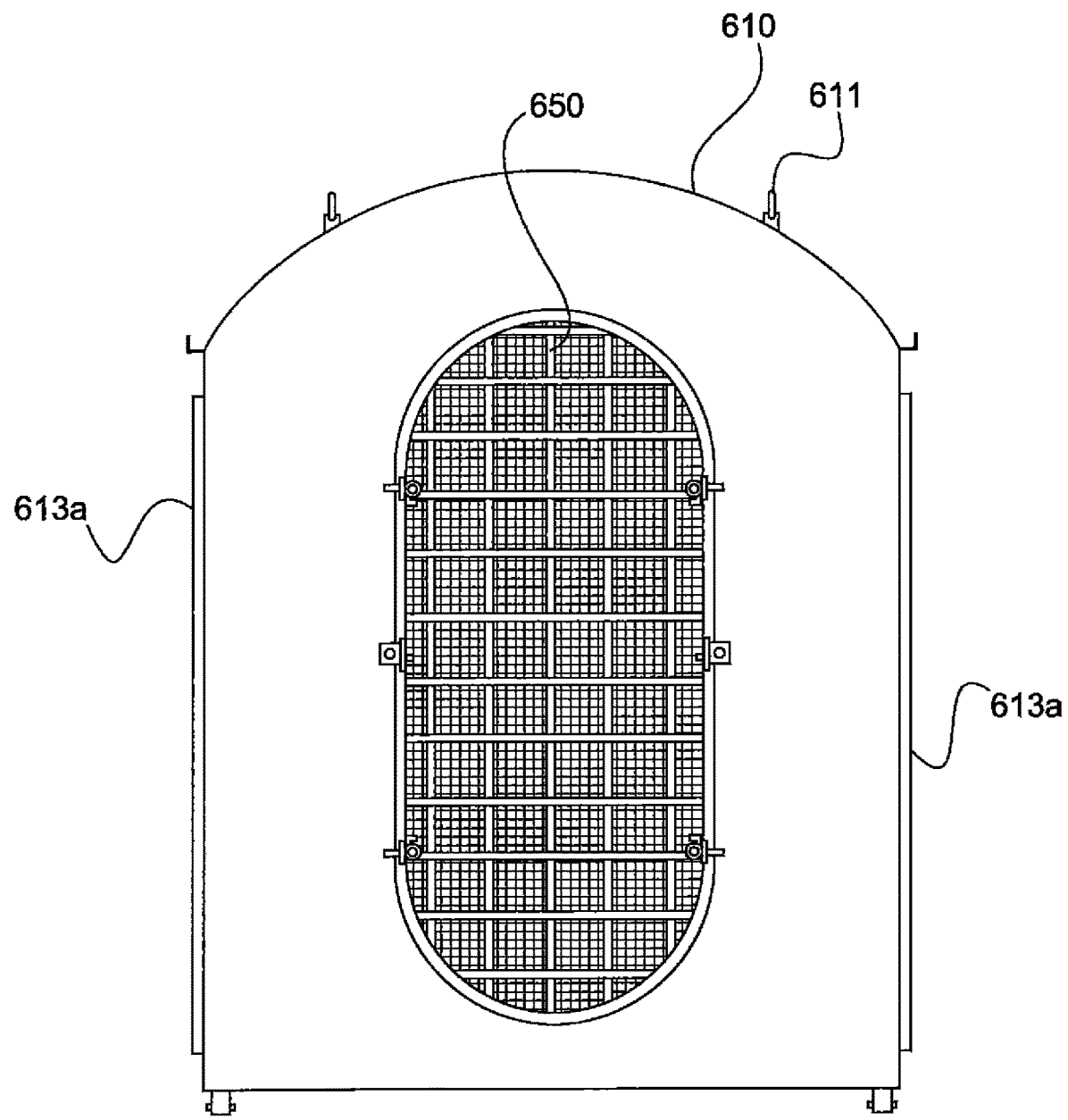
Figure 4O:
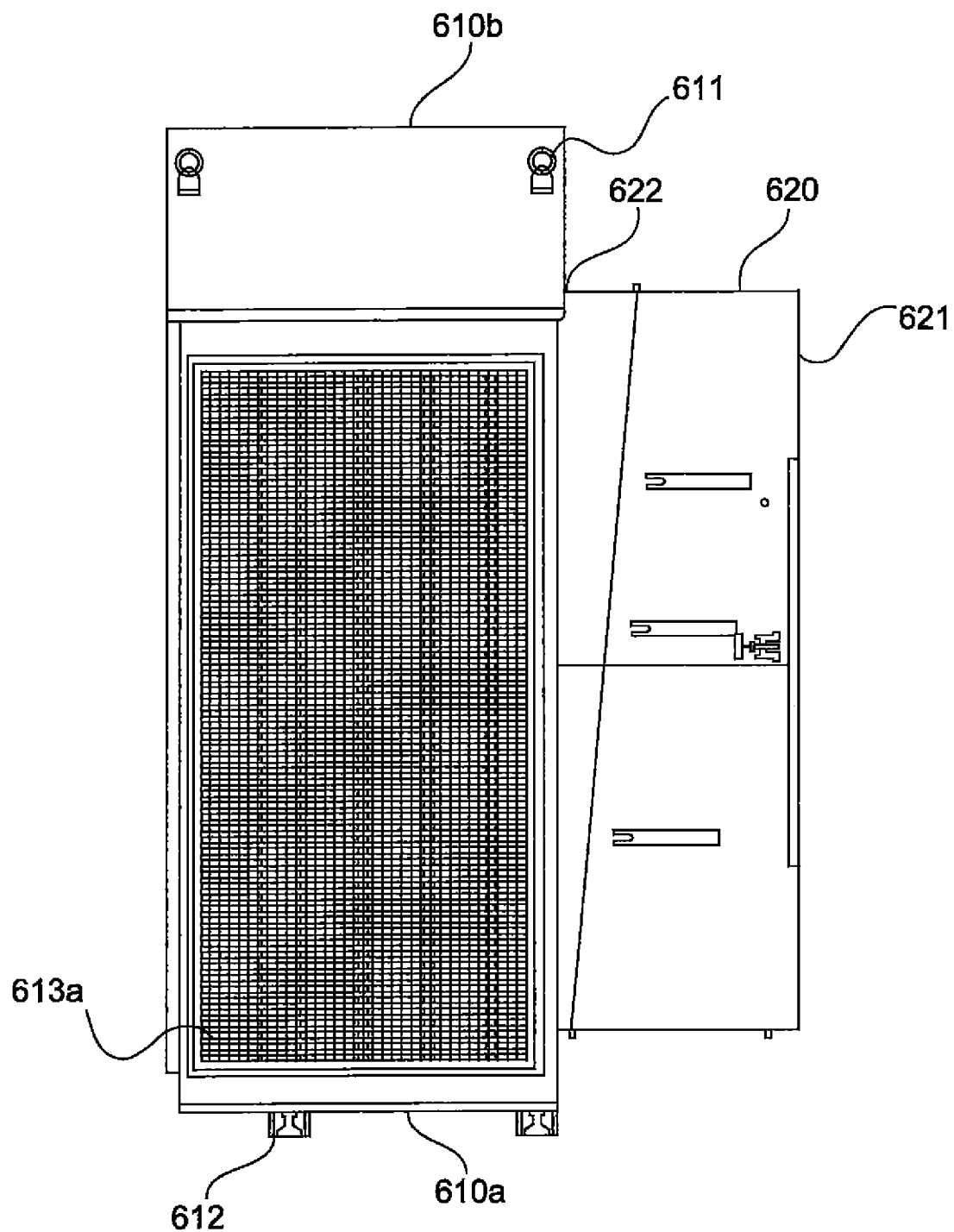

FIGS. 4N and 4O each show a view of the air discharge unit, with the shutter unit not being fitted in place.

Figure 4P:
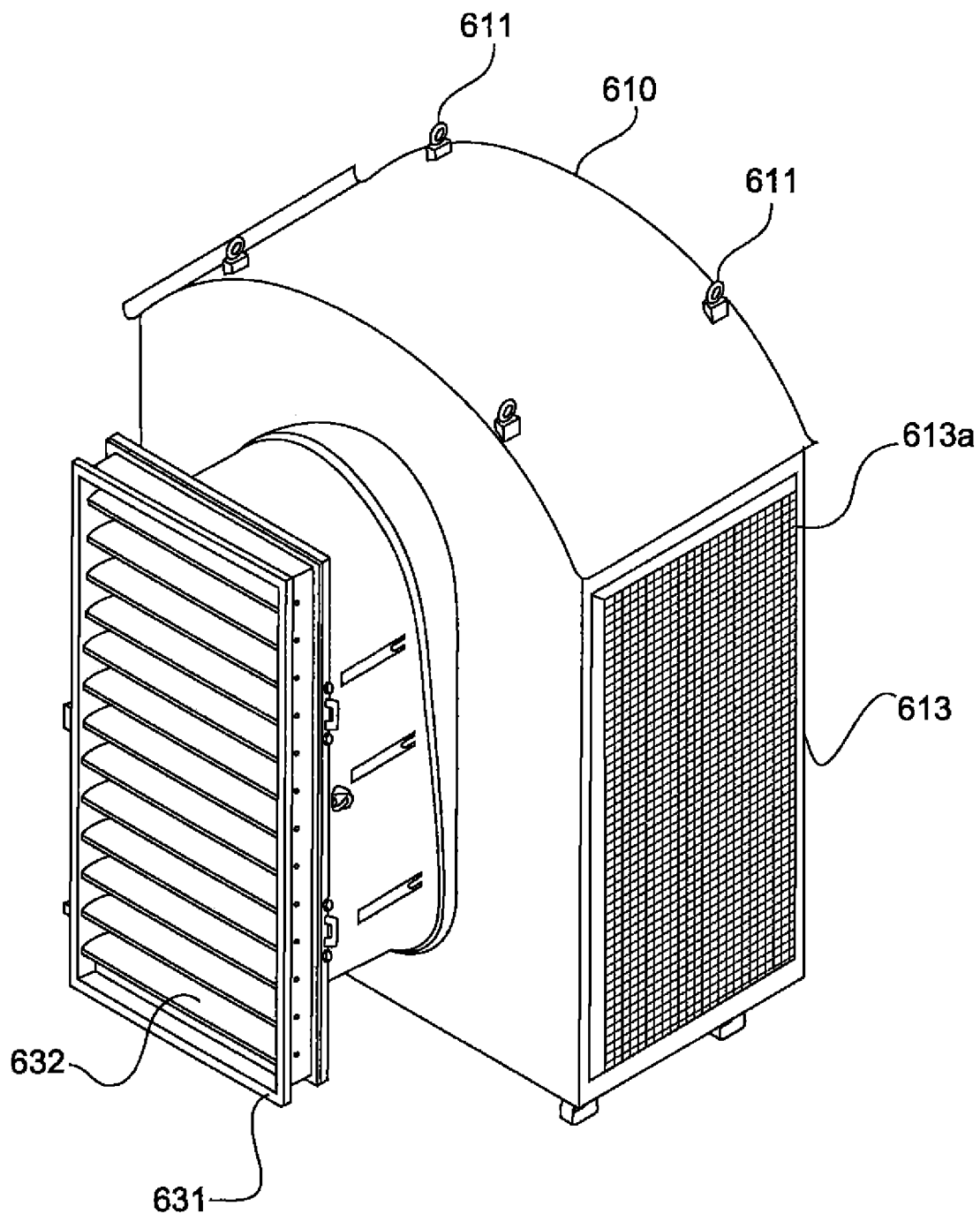

FIG. 4P shows a diagrammatic view of an air discharge unit with the shutter unit 630, the shutter flaps 632 being open.

Figure 4Q:
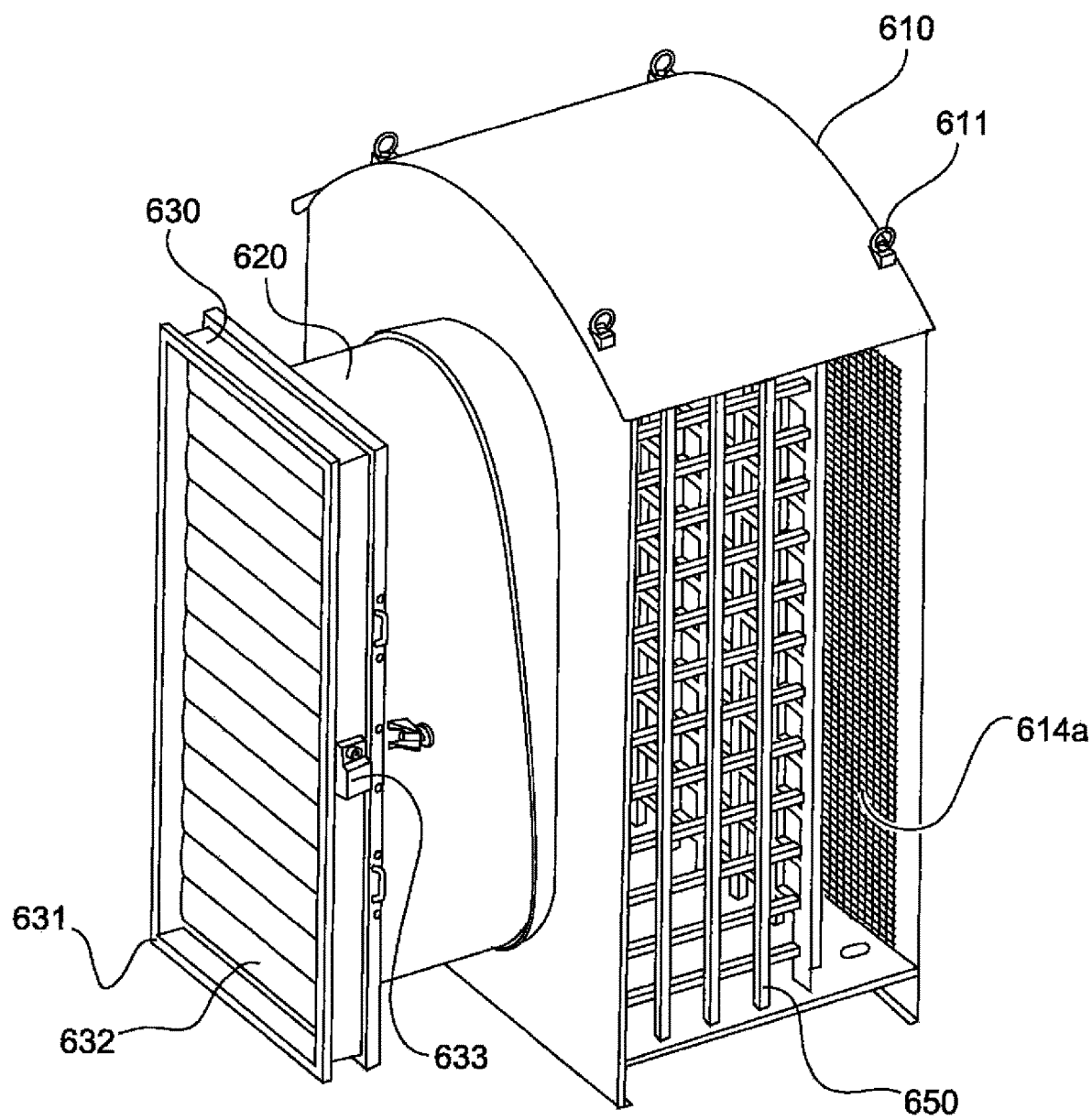

FIG. 4Q shows a diagrammatic view of a ventilation unit 600 according to the second embodiment. Provided in the interior of the outer portion 610 is a grid comprising welded steel or iron bars 450. That grid 450 is intended to serve as further intrusion and vandalism protection. Even if intruders have removed the outer grids 614a, 613a, they thereafter still have to overcome the further grid 650 to get into the installation.

According to an aspect of the present invention the cooling device 1000, besides the air inlet unit 500 and/or the air outlet unit 600, has further components which are required to cool the generator 102 and/or the power cabinet 101. The cooling device 1000 can thus have heat exchangers, fans, passages for a cooling fluid or ventilation passages. The heat exchangers of the cooling device can be coupled by way of cooling fluid passages or ventilation passages or the like to the air inlet unit 500 and/or the air outlet unit 600. The air inlet unit 500 and/or the air outlet unit 600 can optionally have heat exchangers or heat transfer means in order to discharge outwardly the heat of the cooling fluid or the heat from the air.

The present invention concerns in particular the air inlet unit and/or the air outlet unit of the cooling device for a wind turbine. The further configuration of the cooling device in the interior of the wind turbine can be of any desired design configuration.

The invention claimed is:

1. A wind turbine comprising:
a foundation;
a tower on the foundation, the tower having a wall; and
a cooling device proximate the foundation and having at least one air inlet unit and at least one air outlet unit, the at least one air inlet unit and the at least one air outlet unit being arranged at vertical heights on the tower that at least partially overlap each other,
wherein the at least one air inlet unit and the at least one air outlet unit each have a housing with an outer portion, a central portion and a shutter unit,
wherein the outer portions are provided outside the wall of the tower, the central portions are provided in a region of the wall of the tower, and the shutter units are provided within the tower,
wherein the at least one air inlet unit and the at least one air outlet unit have fixing units, wherein the central portions are fixed to the wall of the tower from an interior of the tower by the fixing units,
wherein each of the outer portions has two side surfaces and a front surface each with a first protective grid with bars configured to protect against intrusion and vandalism,
wherein air filters are provided behind the first protective grid of the two side surfaces and the front surface of the at least one air inlet unit,
wherein at least one of the at least one air inlet unit or the at least one air outlet unit has a second protective grid in an interior of the outer portion,
wherein the housing of the at least one air inlet unit and the housing of the at least one air outlet unit have adjustable feet and lifting eyes for transportation purposes.

2. The wind turbine according to claim 1 wherein the bars of at least one first protective grids of the respective outer portions are fixed together.

3. The wind turbine according to claim 1 wherein the shutter units each have a shutter frame, shutter flaps and an adjusting unit, wherein the shutter flaps are displaceable by the adjusting unit.

4. The wind turbine according to claim 1 wherein the at least one air inlet unit or the at least one air outlet unit has a resistance of class 4.

5. The wind turbine according to claim 1 wherein the at least one air inlet unit and the at least one air outlet unit have a resistance of class 4.

6. The wind turbine according to claim 1 wherein both the at least one air inlet unit and the at least one air outlet unit have a respective second protective grid in an interior of the respective outer portions.

\* \* \* \* \*